United States Patent
Atsatt et al.

[11] Patent Number: 5,758,153
[45] Date of Patent: *May 26, 1998

[54] OBJECT ORIENTED FILE SYSTEM IN AN OBJECT ORIENTED OPERATING SYSTEM

[75] Inventors: Bryan P. Atsatt, Redwood City; Earsh K. Nandkeshwar, San Jose; Michael J. Seilnacht, Fremont; Hemantkumar A. Thakkar, Milpitas; George R. Turner, Sunnyvale; Roger R. Webster, San Jose, all of Calif.

[73] Assignee: Object Technology Licensing Corp., Cupertino, Calif.

[*] Notice: The term of this patent shall not extend beyond the expiration date of Pat. No. 5,504,892.

[21] Appl. No.: 547,187

[22] Filed: Oct. 24, 1995

Related U.S. Application Data

[63] Continuation of Ser. No. 303,113, Sep. 8, 1994, Pat. No. 5,504,892.

[51] Int. Cl.⁶ .............................. G06F 17/30; G06F 13/00
[52] U.S. Cl. .............................. 395/614; 395/701
[58] Field of Search .............................. 395/613, 614

[56] References Cited

U.S. PATENT DOCUMENTS

| | | | |
|---|---|---|---|
| 4,821,220 | 4/1989 | Duisberg | 364/578 |
| 4,885,717 | 12/1989 | Beck et al. | 395/704 |
| 4,891,630 | 1/1990 | Friedman et al. | 340/706 |
| 4,953,080 | 8/1990 | Dysart et al. | 395/614 |
| 5,041,992 | 8/1991 | Cunningham et al. | 395/135 |
| 5,050,090 | 9/1991 | Golub et al. | 364/478.05 |
| 5,060,276 | 10/1991 | Morris et al. | 382/151 |
| 5,075,848 | 12/1991 | Lai et al. | 395/479 |
| 5,093,914 | 3/1992 | Coplien et al. | 395/704 |
| 5,119,475 | 6/1992 | Smith et al. | 395/353 |
| 5,125,091 | 6/1992 | Staas, Jr. et al. | 395/671 |
| 5,133,075 | 7/1992 | Risch | 395/800 |
| 5,136,705 | 8/1992 | Stubbs et al. | 395/183.03 |
| 5,151,987 | 9/1992 | Abraham et al. | 395/182.18 |
| 5,181,162 | 1/1993 | Smith et al. | 395/792 |
| 5,313,636 | 5/1994 | Noble et al. | 395/601 |
| 5,315,703 | 5/1994 | Matheny et al. | 395/507 |
| 5,315,709 | 5/1994 | Alston, Jr. et al. | 395/600 |
| 5,317,741 | 5/1994 | Schwanke | 395/704 |
| 5,321,841 | 6/1994 | East et al. | 395/677 |
| 5,325,481 | 6/1994 | Hunt | 395/347 |
| 5,325,522 | 6/1994 | Vaughn | 395/601 |
| 5,325,524 | 6/1994 | Black | 395/610 |
| 5,325,533 | 6/1994 | McInerney et al. | 395/701 |
| 5,335,346 | 8/1994 | Fabbio | 395/609 |
| 5,379,430 | 1/1995 | Nguyen | 395/614 |
| 5,410,691 | 4/1995 | Taylor | 395/611 |

OTHER PUBLICATIONS

"Object Frameworks in the Talligent OS", Glenn Andert, Talligent, Inc., COMPCON Spring '94 IEEE Computer Society Int'l Conference, 1994 IEEE, Mar. 1994.

*Primary Examiner*—Thomas G. Black
*Assistant Examiner*—Hosain T. Alam
*Attorney, Agent, or Firm*—Bookstein & Kudirka

[57] ABSTRACT

An object-oriented file system in an object-oriented operating system includes a file system entity class that is subclassed into a volume, directory and file subclass. These classes encapsulate standard file system properties such as name, creation date, and size, as well as standard operations such as create, open, close, and property accessors. Using object-oriented programming, the class properties and operations can easily be modified and extended. Also provided is a convenient and efficient means for searching through the entities, and collecting heterogeneous sets. Further, a category of notification classes is provided for notifying clients when an entity has changed. Still further, user authentication and protection domains are used to protect against unauthorized access. Finally, a means for working with foreign file systems running under different operating systems is provided.

13 Claims, 11 Drawing Sheets

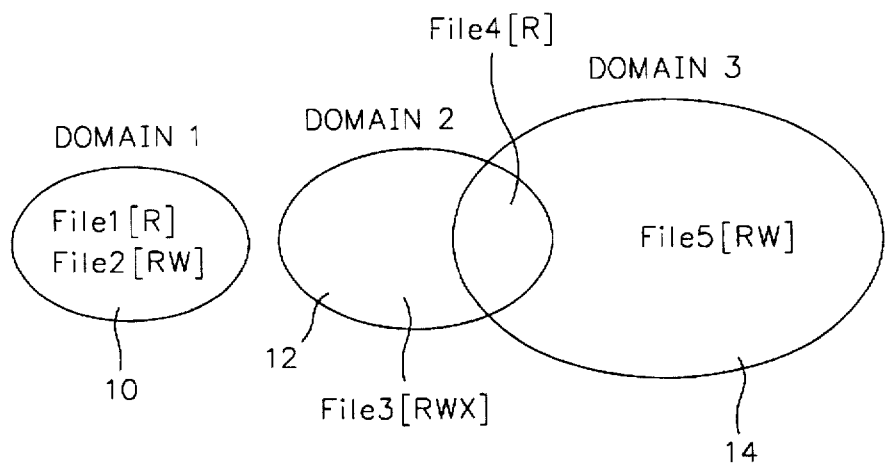
FIG. 4
16 — File1: (user1,RW)
18 — File2: (user1,R),(user2,RW),(user3,X)
20 — File3: (user1,X),(user3,W)
FIG. 5
54 — FSRead(refNum,count,bufferPtr)
52 — FSWrite(refNum,count,bufferPtr)
with labels 56, 68, 60 above refNum, count, bufferPtr respectively.
FIG. 7
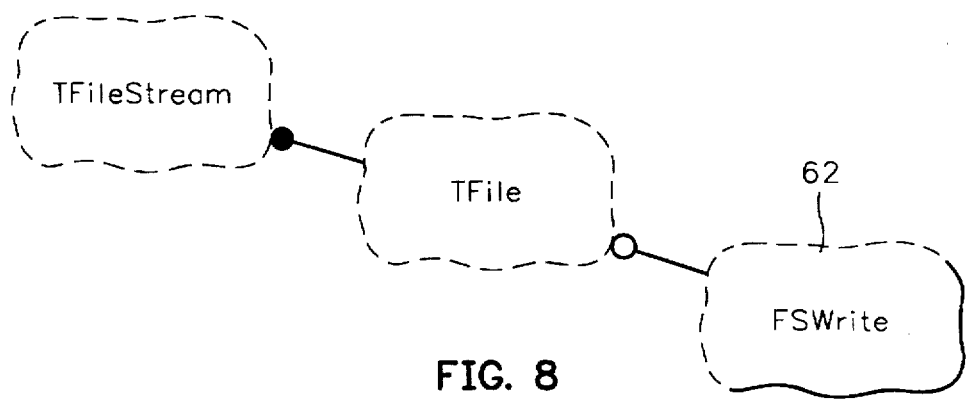
FIG. 8

CLASS ICONS

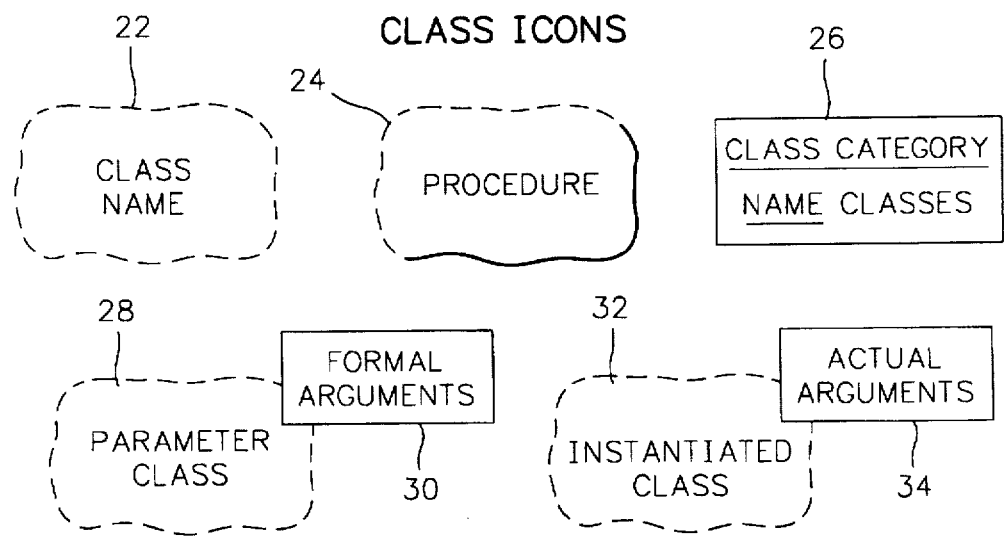

CLASS RELATIONSHIPS

LINKS

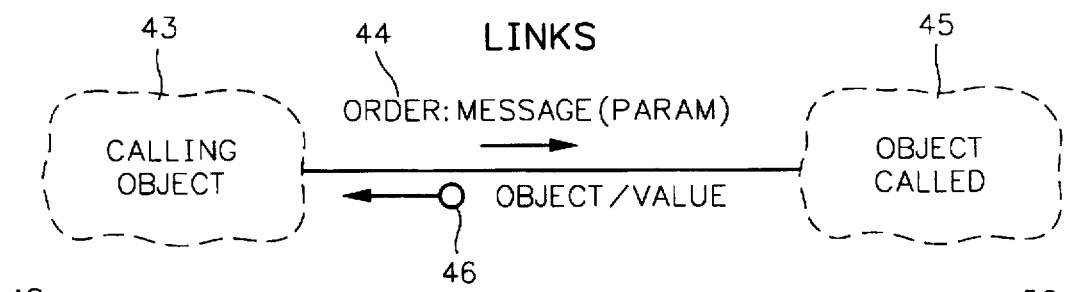

PROPERTIES

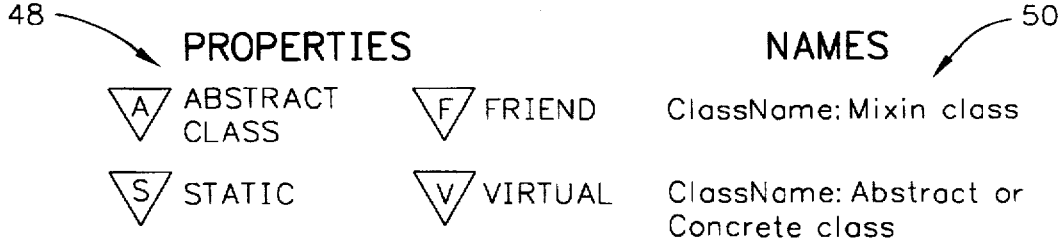

NAMES

ClassName: Mixin class

ClassName: Abstract or Concrete class

VISIBILITY

[G] The object called is global to the calling object

[P] The object called is a parameter to some operation of the calling object

[F] The object called is a part of the calling object

[L] The supplier object is a locally declared object in the scope of the object diagram

FIG. 6

OBJECT ORIENTED FILE SYSTEM IN AN OBJECT ORIENTED OPERATING SYSTEM

This application is a continuation of application Ser. No. 08/303,113 filed Sep. 8, 1994, now U.S. Pat. No. 5,504,892.

FIELD OF INVENTION

The present invention relates to file systems for computer operating systems. Specifically the present invention relates to an object-oriented file system.

BACKGROUND OF THE INVENTION

As will be understood by those skilled in the art, Object-Oriented Programming (OOP) techniques involve the definition, creation, use and destruction of "objects". These objects are software entities comprising data elements and routines, or functions, which manipulate the data elements. The data and related functions are treated by the software as an entity that can be created, used and deleted as if it were a single item. Together, the data and functions enable objects to model virtually any real-world entity in terms of its characteristics, which can be represented by the data elements, and its behavior, which can be represented by its data manipulation functions. In this way, objects can model concrete things like people and computers, and they can also model abstract concepts like numbers or geometrical designs.

A full discussion of the object-oriented terms, notation and diagrams used in this disclosure is provided in "Object-Oriented Analysis and Design", edited by Grady Booch, and published by Benjamin Cummings, 1994. A brief overview of the Booch notation is shown in FIG. 5 with a class 22 being denoted by an amorphous blob, and a utility procedure 24 by a shadowed amorphous blob. A class category 26 is denoted by a rectangle, and contains a collection of related classes. A parameterized class 28 is denoted by an amorphous blob with a rectangle for the formal arguments 30, and an instantiated parameterized class 32 is denoted by an amorphous blob with a rectangle for the actual arguments 34. Relationships between the classes are denoted by an association line 36, inheritance arrow 38, "has a" solid circle line 40, and "uses" open circle line 42. Links between calling 43 and called 45 objects are denoted by an order-:message arrow 44 and an object/value open circle arrow 46. Also shown is the symbols for denoting class properties 48 and the naming convention 50. The visibility of the called object 45 in relation to the calling object 43 is depicted by the letters G, P, F, and L, enclosed in a square 51 and representing Global, Parameter, Field ("part of" relationship), and Local respectively.

Provided bellow are definitions of some object oriented terms used in this disclosure:

base class
the most abstract class of a framework from which all other classes are derived.
super class
a class from which other classes are derived.
subclass
a class that is derived from one or more super classes.
abstract class
A class that defines abstract behavior and is used only as a super class for other subclasses, where the subclasses implement the abstract behavior. No instances are derived from an abstract class.
pure virtual method
A method of an abstract class that must be overridden and implemented in a subclass.
concrete class
A class that is complete in its implementation and may therefore have instances. A concrete class can also be a super class to other subclasses.
primitive type
A data simple data type such as an integer, unsigned integer, long, character, etc.
extended type
A complex data type such as an object.

Objects are defined by creating "classes" which are not objects themselves, but which act as templates that instruct the compiler how to construct an actual object. A class may, for example, specify the number and type of data variables and the steps involved in the functions which manipulate the data. An object is actually created in the program by means of a special function called a "constructor" which uses the corresponding class definition and additional information, such as arguments provided during object creation, to construct the object. Likewise objects are destroyed by a special function called a "destructor". Objects may be used by manipulating their data and invoking their functions.

The principle benefits of object-oriented programming techniques arise out of three basic principles; encapsulation, polymorphism and inheritance. More specifically, objects can be designed to hide, or encapsulate, all, or a portion of, the internal data structure and the internal functions. During program design, a program developer can define objects in which all or some of the data variables and all or some of the related functions are considered "private" or for use only by the object itself. Other data or functions can be declared "public" or available for use by other programs. Access to the private variables by other programs can be controlled by defining public functions for an object which access the object's private data. The public functions form a controlled and consistent interface between the private data and the "outside" world. Any attempt to write program code which directly accesses the private variables causes the compiler to generate an error during program compilation which error stops the compilation process and prevents the program from being run.

Polymorphism is a concept which allows objects and functions which have the same overall format, but which work with different data, to function differently in order to produce consistent results. For example, an addition function may be defined as variable A plus variable B (A+B) and this same format can be used whether the A and B are numbers, characters or dollars and cents. However, the actual program code which performs the addition may differ widely depending on the type of variables that comprise A and B. Polymorphism allows three separate function definitions to be written, one for each type of variable (numbers, characters and dollars). After the functions have been defined, a program can later refer to the addition function by its common format (A+B) and, during compilation, the C++ compiler will determine which of the three functions is actually being used by examining the variable types. The compiler will then substitute the proper function code. Polymorphism allows similar functions which produce analogous results to be "grouped" in the program source code to produce a more logical and clear program flow.

The third principle which underlies object-oriented programming is inheritance, which allows program developers to easily reuse pre-existing programs and to avoid creating software from scratch. The principle of inheritance allows a software developer to declare classes (and the objects which are later created from them) as related. Specifically, classes may be designated as subclasses of other base classes. A subclass "inherits" and has access to all of the public functions of its base classes just as if these function appeared in the subclass. Alternatively, a subclass can override some or all of its inherited functions or may modify some or all of its inherited functions merely by defining a new function with the same form (overriding or modification does not alter the function in the base class, but merely modifies the use of the function in the subclass). The creation of a new subclass which has some of the functionality (with selective modification) of another class allows software developers to easily customize existing code to meet their particular needs.

Although object-oriented programming offers significant improvements over other programming concepts, program development still requires significant outlays of time and effort, especially if no pre-existing classes are available for modification. Consequently, a prior art approach has been to provide a program developer with a set of pre-defined, interconnected classes which create a set of objects and additional miscellaneous routines that are all directed to performing commonly-encountered tasks in a particular environment. Such pre-defined classes and libraries are typically called "application frameworks" and essentially provide a pre-fabricated structure for a working application.

For example, an application framework for a user interface might provide a set of pre-defined graphic interface objects which create windows, scroll bars, menus, etc. and provide the support and "default" behavior for these graphic interface objects. Since application frameworks are based on object-oriented techniques, the pre-defined classes can be used as base classes and the built-in default behavior can be inherited by developer-defined subclasses and either modified or overridden to allow developers to extend the framework and create customized solutions in a particular area of expertise. This object-oriented approach provides a major advantage over traditional programming since the programmer is not changing the original program, but rather extending the capabilities of the original program. In addition, developers are not blindly working through layers of code because the framework provides architectural guidance and modeling and, at the same time, frees the developers to supply specific actions unique to the problem domain.

There are many kinds of application frameworks available, depending on the level of the system involved and the kind of problem to be solved. The types of frameworks range from high-level application frameworks that assist in developing a user interface, to lower-level frameworks that provide basic system software services such as communications, printing, file systems support, graphics, etc. Commercial examples of application frameworks include MacApp (Apple), Bedrock (Symantec), OWL (Borland), NeXT Step App Kit (NeXT), and Smalltalk-80 MVC (ParcPlace).

While the application framework approach utilizes all the principles of encapsulation, polymorphism, and inheritance in the object layer, and is a substantial improvement over other programming techniques, there are difficulties which arise with the prior art application frameworks. Typically, application frameworks generally consist of one or more object "layers" on top of a procedure based operating system and even with the flexibility of the object layer, it is still often necessary to directly interact with the underlying operating system by means of awkward and inefficient procedure calls. In the same way that an application framework provides the developer with prefab functionality for an application program, a system framework, such as that included in a preferred embodiment, can provide a prefab functionality for system level services which developers can modify or override to create customized solutions, thereby avoiding the procedural calls necessary with the prior art application frameworks. For the commercial or corporate developer, systems integrator, or OEM, this means all of the advantages that have been illustrated for a framework, such as MacApp, can be leveraged not only at the application level for such things as text and user interfaces, but also at the system level, for services such as printing, graphics, multi-media, networking, I/O, and, as described herein, file systems.

A major part of computer operating systems is the system responsible for handling information stored in files. There are file systems designed for single processor systems such as Macintosh Hierarchical File System (HFS) and MS-DOS, or multiple processor distributed file systems such as AppleShare, Sun Network File System (NFS), or UNIX file system. A distributed file system is normally a super set of a single processor file system, that is, a distributed file system normally has all the features and capabilities of a single processor system except that it is distributed over several computers using a network. A full discussion of Macintosh HFS and AppleShare file systems is provided in "Inside Macintosh Volume IV, V, VI", published by Addison Wesley, and a discussion of MS-DOS, NFS, UNIX, and other file systems is provided in "Modem Operating Systems", edited by Andrew S. Tanenbaum and published by Prentice Hall. These file systems have a common architecture and provide similar capabilities.

Normally, file data is stored in non-volatile storage mediums such as disk drives. A computer usually has access to one or more disk drives connected directly to it, and may have access to disk drives connected to other computers through a network. Each storage device or disk drive is normally represented by a volume, however a disk can be partitioned into multiple volumes. A volume contains a directory tree where each node in the tree is a unique directory. A directory contains a collection of files which are the leaves of the tree, and can also have branches represented by subdirectories, where each subdirectory also contains files and may branch into further subdirectories. A volume is also the root of the directory tree 2 as shown in FIG. 1. To access a file, the user specifies the volume and directory where the file is located.

Volumes, directories, and files are entities with specific information and functions associated with each. The information associated with a file system entity is referred to as the attributes or properties, and the functions define the operations for manipulating these properties. There are also functions for retrieving and storing the contents of a file system entity, but the file system normally does not know or care about what is in the file. Interpreting the data content and format is done at the application level, while the file system is responsible for handling application requests such as retrieving information about a file, or storing and retrieving file data. The disclosure herein discusses the most common properties and functions provided by the different file systems.

Files

Files are entities for storing application and operating system data in a variety of formats including binary and ASCII records. Each file has associated with it specific properties used by the file system for handling application requests. Common properties for a file include:

File Name

An ASCII string is used for identifying the file. Some systems allow the file name to include the path name for specifying the volume and directory where the file is located. An example path name is: Volume1:Directory1:Filename.

Creation Time
The time and date the file was created.

Modification Time
The time and date the file was last changed.

Type
The type of file (application file, data file, etc.).

Home File System
The file system that created the file (MS-DOS, HFS, AppleShare, NFS, etc.).

Open State
Specifies whether the file has been opened for accessing.

Physical Size
The number of bytes currently allocated for the file.

Actual Size
The number of bytes currently used by the file.

Access Control
Protection mechanism for controlling access to the file.

Permissions
Specifies operations permitted (read only, read/write, shared read, shared read/write, etc.).

Principle
Owner of the file.

Position
Pointer into the file data where the next read or write will begin.

The file properties are used at both the operating system and application level. For instance, an application may need to acquire the name and type of a file for displaying in an open file dialog. Applications obtain access to file properties and file data through operations provided by the file system. Common file operations include:

Create
A file is created and initialized with specified properties.

Delete
When a file is no longer needed, it is deleted to free up disk space.

Open
Before accessing a file, an application must open it. The purpose of the Open is to load the file's properties into main memory for access by subsequent file system calls.

Close
When an application is finished accessing a file, the properties are no longer needed, so the file is closed to free up the main memory.

Read
An application reads data from a file into a specified buffer. Reading normally begins at the current position.

Write
An application writes data to a file from a specified buffer. Writing normally begins at the current position.

Seek
An application can seek to a specific position in the file before reading or writing.

Get and Set Properties
Provides application access to the file properties.

An application may need to read or modify the file properties. For instance, an application may need to display the file names and types in an open dialog, or re-name a file, or modify the permissions, or modify the access control, etc.

RangeLocking
If the permissions of a file allows multiple writers, each writer can lock a range of data to prevent multiple writes to the same data.

Directories
The file system stores files in a directory tree as shown in FIG. 1. The root directory 2 is also the volume where the directory tree is located. Each directory can contain a collection of files 4 and subdirectories 6 where subdirectories are further branches in the directory tree. Directories have properties used by the file system for handling application requests which are similar to the file properties. Common properties for a directory include:

Directory Name
An ASCII string is used for identifying the directory. Some systems allow the directory name to include the path name for specifying the volume and directory path where the directory is located. An example of a directory path name is: Volume1:Directory1:.

Creation Time
The time and date the directory was created.

Modification Time
The time and date the directory was last changed.

Home File System
The file system that created the directory (MS-DOS, HFS, AppleShare, NFS, etc.).

Physical Size
The number of bytes currently allocated for the directory.

Actual Size
The number of bytes currently used by the directory.

Access Control
Protection mechanism for controlling access to the directory.

Principle Owner of the directory.

The file system also provides operations for handling requests by an application for accessing directories. Common directory operations include:

Create
A directory is created and initialized with specified properties.

Delete
When a directory is no longer needed, it is deleted to free up disk space.

Get and Set Properties
Provides application access to the directory properties. An application may need to read or modify the directory properties. For instance, an application may need to display the directory names in an open dialog, or re-name a directory, or modify the access control.

Volumes
A disk drive normally represents one volume 2 as shown in FIG. 1, but it can also be partitioned into several volumes. A volume is also the root directory of the directory tree stored on the volume. Volumes are either mounted or unmounted, and a computer does not have access to a volume until it is mounted. Volumes also have properties used by the file system for handling application requests. Common properties for a volume include:

Volume Name
An ASCII string is used for identifying the volume.

Creation Time
   The time and date the volume was created.
Modification Time
   The time and date the volume was last changed.
Home File System
   The file system that initialized the volume (MS-DOS, HFS, AppleShare, NFS, etc.).
Physical Size
   The number of bytes currently allocated for the volume.
Actual Size
   The number of bytes currently used by the volume.
Access Control
   Protection mechanism for controlling access to the volume.

The file system also provides operations for handling requests by an application for accessing volumes. Common volume operations include:

Mount Volume
   A volume must be mounted before it can be accessed.
Unmount Volume
   A volume is unmounted when it is no longer needed.
Initialize
   A volume is initialized and formatted for the specific home file system.

Not all file systems provide all of the above listed properties and operations, and some systems provide additional properties and operations. However, most all file systems implement the operations for manipulating the properties and file data using traditional procedural programming.

In procedural programming, the data is separate from the operations on the data. When developing procedure based systems, the programmer defines the data and the operations on the data separately. Further, the data structures which represent the file system entities are "flat" rather than "hierarchical" due to the lack of inheritance. This separation of data from function results in less reliable and less extensible code, the two primary factors behind the promulgation of object-oriented programming.

There have been attempts to integrate the benefits of object-oriented programming into the entities of a procedural based file system by including file entity classes as part of an application framework. For instance, in Apple Computer's application framework for the Macintosh operating system (MacApp) a TFile class 8 is provided as an interface to the procedure based file system (see "Programmer's Guide to MacApp", Developer Technical Publications, 1992). Another example is the CFile class provided in Visual C++, Microsoft's application framework for the Windows operating system (see "Visual C++, Reference Volume I", Microsoft, 1993). An abbreviated version of the MacApp TFile class 8 as shown in FIG. 3A encapsulates the properties, data, and operations of a Macintosh file into a standard object-oriented class that programmers are familiar with. However the benefits of object-oriented programming (mainly extendibility) are not realized with this implementation because the underlying design is still procedural.

A programmer cannot extend the MacApp TFile class by adding new properties and operations into a subclassed file because the Macintosh file system itself cannot be extended. The properties and operations defined for the Macintosh file system entities are fixed, and because they are procedural, they cannot be extended. The only way Apple has added additional properties or functions to the Macintosh file system entities has been to release a new version of the operating system. Having to release a new version of the operating system to extend the capabilities of the file system is undesirable.

File Data Access
In addition to providing operations for manipulating file properties, file systems provide a means for reading and writing file data. In prior art file systems, data is read from and written to a file using standard procedural calls as shown in FIG. 6. For the Macintosh, data is read from a file using FSRead 54 and data is written to a file using FSWrite 52. Both procedures take a file reference number 56, a count 58 number of bytes to be read/written, and a buffer 60 to read data into or write data from.

The problem with accessing file data with standard procedures is that structured data such as objects must be "flattened" into a linear sequence of bytes before being written to the file. This is especially burdensome when an object encapsulates other objects which must also be "flattened" in the correct order. Similarly, when reading data from a file, the exact ordering used to write the data must be re-created, and as the data is read, it must be typed coerced before being assigned back to an object.

To overcome these problems, application frameworks such as MacApp provide a stream class for reading and writing file data (see "Programmers Guide to MacApp", Developer Technical Publications, 1992, at p.416-423). The stream class provides a convenient general means for accessing file data, including methods for reading and writing primitive data types such as bytes, integers, and characters. A stream can also be subclassed for reading and writing other extended data types such as objects. Although the stream class greatly simplifies the task of manipulating file data in an object-oriented application, there are problems with these prior implementations.

Even though the task of accessing file data is encapsulated into the prior art stream class, the stream's TFile 8 still must make the standard read/write procedure call 62 provided by the procedure based file systems as shown in FIG. 6. Having to call the file system procedure 62 adds an extra layer of overhead resulting in longer file access times. Since file access is usually the largest bottleneck in an operating system, increasing the access time is extremely undesirable. The present invention overcomes this problem by incorporating the prior art procedure call 62 into the TFile class, thereby reducing the overhead by obviating the additional procedure call.

Searching
A further feature provided by most file systems is the ability to perform searches to retrieve specific entities and their properties. For instance, a user might want to search a volume for a specific file or directory, or to retrieve all the files of a given type. An example would be to search a volume for a file named "document.doc", or to retrieve all the files of type "source code" from a directory. Most file systems provide a limited capability, if any, for searching for entities and their properties.

Apple's Macintosh file system for operating system 7 provides the ability to search volumes using a procedure called PBCatSearch (see "Inside Macintosh, Volume VI", pages 25-20 to 25-25, edited by Addison Wesley). PBCatSearch allows a programmer to search for a group of files or directories based on a set of properties. The programmer fills out a record defining the set of properties for the entities being searched, and sends the record to the PBCatSearch procedure. Also provided is the ability to specify a range of values for the properties such as entity size or creation date. For instance, a programmer can search for all the files whose names contain the string "Temp" and that were created within the past two days. Because PBCatSearch and the Macintosh file system are procedural, the capabilities are limited in many respects.

Using PBCatSearch, the user cannot perform searches to retrieve a group of file system entities that contains both files and directories. Also, a user cannot perform searches based on entity properties other than those implemented by PBCatSearch, and the types of range queries is limited to only a few properties such as size and date. Further, since the properties of the Macintosh file system cannot be extended, the ability to perform custom storage and retrieval is not possible. These limitations are due in large part to the fact that the Macintosh file system is procedural rather than object-oriented.

Notification

Many object-oriented application frameworks provide the ability to create object dependencies. An object dependency is established when one object in the system needs to be notified when another object has been changed. For instance, a view represented as one object might display data represented by another object. The view object needs to be notified when the data object has changed so the view object can display the new data, therefore a dependency is established between the view object and data object. An example of such dependency capability is provided by Apple's MacApp application framework as described in "Programmers Guide to MacApp", Developer Technical Publications, 1992, at p.52. Although the dependency and notification ability is provided by application frameworks, the concept has not been incorporated into prior art file systems because they are not object-oriented.

User Authentication

Another feature provided by operating systems is security against unauthorized access to file system entities. For instance, access to a volume, directory, or file might be restricted to a particular user, so the operating system provides a means for preventing access to anyone other than the authorized user. User authentication is normally implemented by the users entering their identification and a password which is verified by the local authentication service.

Protection Domains

Most operating systems provide a further level of protection for file system entities called protection domains. A protection domain is defined as a set of {Object, Rights} pairs. For a file system, the objects are the file system entities and the rights are read, write, execute, etc. An example of a file system protection domain is shown in FIG. 3B. Domain1 10 has read access to File1 and read/write access to File2, Domain2 12 has read/execute access to File3 and read access to File4, Domain3 14 has read access to File4 and read/write access to File5.

In a file system, the protection domains are represented as a user or a group. The accessible files and access rights are defined for each domain. As an example, a user may belong to a group which has access to a particular number of executable files, as well as exclusive access to personal data files. For instance, a teacher may have access to a word processing and grading program and exclusive access to student data files. The students, as a group, may have access only to the word processing file, and each student may have exclusive access to their own personal data files.

Foreign File Systems

Some file systems are compatible with other foreign file systems running under different operating systems. For instance, the Macintosh AppleTalk Filing Protocol (AFP) described in "Inside AppleTalk", edited by Gurshran S. Sidhu et al and published by Addison Wesley, was designed specifically to allow workstations to share files across a network with remote servers running different operating systems. This transparency is accomplished with a special AFP program running on both the workstation and the server with the remote volumes.

The AFP program running on the workstation communicates with the AFP program running on the remote server over the network. Remote volumes connected to the remote server are mounted for access by applications running on the workstation. When an application running on the workstation makes a file request using the native file system, the AFP program determines if the file is located on a remote volume. If the file is located on a remote volume, the AFP program running on the workstation translates the native file system request into an AFP format, and sends the AFP request to the AFP program running on the remote server. The AFP program running on the remote server handles the file request and sends an AFP response to the AFP program running on the workstation. The AFP program running on the workstation translates the AFP response from the remote server back into the native file system format of the workstation, and the native response is sent to the application which made the original file request. Using AFP, any application running on a workstation has transparent access to remote volumes connected to servers running different operating systems.

A major drawback with the AFP system is that AFP programs must be written for every workstation and remote server running different operating systems. Since AFP was implemented using traditional procedural programming, writing the AFP programs is more difficult because a programmer starts only with the specification of the AFP protocol. The entire AFP program must be designed, implemented, and debugged. The result is a longer development time and less reliable programs. Longer development time and less reliability are problems inherent in procedure based programs. The present invention overcomes these problems because the file system is implemented with object-oriented programming, a technology which facilitates extendibility.

Another major problem with the AFP system is the significant latency caused by accessing the remote files over the network. Access times for local volumes is only a few milliseconds, but every remote file access suffers the additional delay in transmitting a request and receiving a response over the network. These delays can amount to several seconds for every file request. For many applications where file access time is critical the network delays are simply unacceptable.

The present invention overcomes this problem because compatibility with foreign file systems is accomplished at the file system entity level. A file from a remote server running under a different operating system is packaged into a format compatible with the file system of the present invention. The packaged file can be transported over the network to the workstation's local volume for direct accessing, and when the application is finished with the file, it is transported back to the server's volume and unpackaged back into the server's file system format.

It is, therefore, a main object of the present invention to provide an extensible object oriented file system in an object oriented operating system by providing a category of file system classes which encapsulate a plurality of properties from a category of property classes, with support for batch and query search and retrieval, and support for notification, user authentication, protection domains, and interoperability with foreign file systems.

SUMMARY OF THE INVENTION

The objects of the present invention are achieved by providing a framework of file system classes in an object-oriented operating system. A file system class category including a volume, directory, and file class are derived from a base file system entity class called TFSEntity. The file system classes encapsulate property objects, such as name and type, as provided in a category of property classes. Other classes can be derived from these base file system classes to override, modify, or extend the member functions or properties without having to change the basic operation of the file system or releasing a new version of the operating system.

Many of the objects in the file system are surrogate objects that represent some real object. Every surrogate object encapsulates an identifier that names its associated real object, the identifier being used to update the real object when the surrogate object changes. If the real object is deleted, the surrogate becomes invalid and subsequent calls on the surrogate will raise an exception.

TFSEntity encapsulates the standard properties and operations that are common across the derived classes. Some common properties of file system entities are its name, type, and creation date, and common operations include accessor methods to the properties. The derived classes, TFile, TDirectory, and TVolume inherit TFSEntity properties and operations, and provide additional properties and operations specific to the derived class. The derived classes can be further subclassed to facilitate different properties and operations as necessary.

Although there are classes provided in the present invention for accessing a file's data, the file system does not normally know or care about the content or format of the file data. Interpretation and manipulation of file data is handled at the application level, while the file system is responsible mainly for handling application requests for manipulating the entity properties. For instance, an application will frequently need to access a file system entity based on a particular name or type. The present invention provides an efficient and convenient means for providing access to entity properties implemented using a category of property classes.

The property classes are used for accessing properties of any object or collection of objects in both applications and the operating system. The file system is a client of the property category with TFSEntity being derived from a property class called MPropertyStore. MPropertyStore is a class for storing, retrieving and manipulating a set of properties such as the properties of a file system entity.

The property classes provide the capability to search through a collection of file system entities, and to retrieve a subset of the collection based on certain criteria. Searching can be based on a specific match such as searching for a specific file name, or it can be based on a range of values such as all entities with a creation date after Jan. 15, 1966. There are two property classes which facilitate searches over a collection of file system entities: TIterator and TPropertyQuery. The TIterator class is used to iterate through a collection of objects, and the TPropertyQuery class is used to define a simple query expression for collecting the desired properties during the iteration. Since properties are classes, they can be modified and extended, thereby providing a means for custom storage and retrieval.

TFSEntity is also derived (through multiple inheritance) from a general collection class called MCollectible. MCollectible is an abstract class for an object which is collected into a set, such as collecting file system entities into a set. The MCollectible class also facilitates "flattening" objects into a TFileStream for storing file system entities to disk, and facilitates "resurrecting" objects from a TFileStream when reading file system entities from the disk.

Dependencies between file system entities and clients of the entities are achieved using a category of notification classes. The notification classes are used for creating dependencies between objects for both applications and the operating system. In the file system context, a view may be a client to a file containing the view's data, therefore the view needs to be notified when the contents of the file changes. Using the notification category, the client view "connects" itself to the file, and the file notifies the view when any changes of interest occur. When the view receives notification from the file, the view retrieves the new data from the data object and re-draws itself.

To implement dependencies, the TFSEntity class is also derived (through multiple inheritance) from the TStandardNotifier notification class. A TStandardNotifier such as a file system entity can be "connected" to an interested client for notification when the entity changes. An interested client uses the TNotifierConnection class to connect itself to a particular file system entity. When the entity changes, a TNotification object is sent to the connected client.

User authentication for protecting against unauthorized access to file system entities is achieved by providing a local authentication service. Before allowing access to a workstation, a user is required to enter an identifier and password. The ID and password are checked by the local authentication service, and if verified, the ID is stored in a TCredentials object. A new principle is created and associated with the user, and the TCredentials object is assigned to the principle. Before allowing the new principle access to any file system entity, the principle's access rights are looked up in the file system entity's access control list (ACL).

The file system entity's ACL is the method used to implement protection domains. A protection domain is a set of {Object, Rights} pairs, and for the file system, the Object is a principal or group of principles, and the Rights define the principle's access to the file system entity. A principle will only "see" those file system entities which have granted access rights to the principle, and the access is limited to the rights defined in the ACL entry. A TAccessControl object is used to read and modify a file system entity's access control list. The ACL is a TProperty of every file system entity.

The file system of the present invention also provides a means for working with files from foreign file systems. Providing compatibility with foreign file systems is called interoperability, and it is achieved in the present invention by "packaging" a foreign file into a compatible format before transporting it to the file system of the present invention. The files are "unpackaged" into the format of the foreign file system when transported back to the foreign file system.

BRIEF DESCRIPTION OF THE DRAWINGS

FIG. 4 is an illustration of protection domains for a file system in accordance with a preferred embodiment of the invention;

FIG. 5 is an example of an access control list for three different files in accordance with a preferred embodiment of the invention;

FIG. 6 is an overview of the Booch notation used in this disclosure in accordance with a preferred embodiment of the invention;

FIG. 7 depicts the Macintosh procedure calls for reading and writing files in accordance with a preferred embodiment of the invention;

FIG. 8 shows the Macintosh FSWrite procedure being called from the MacApp TFile during a file stream operation in accordance with a preferred embodiment of the invention;

DETAILED DESCRIPTION OF A PREFERRED EMBODIMENT OF THE INVENTION

Figure 1:
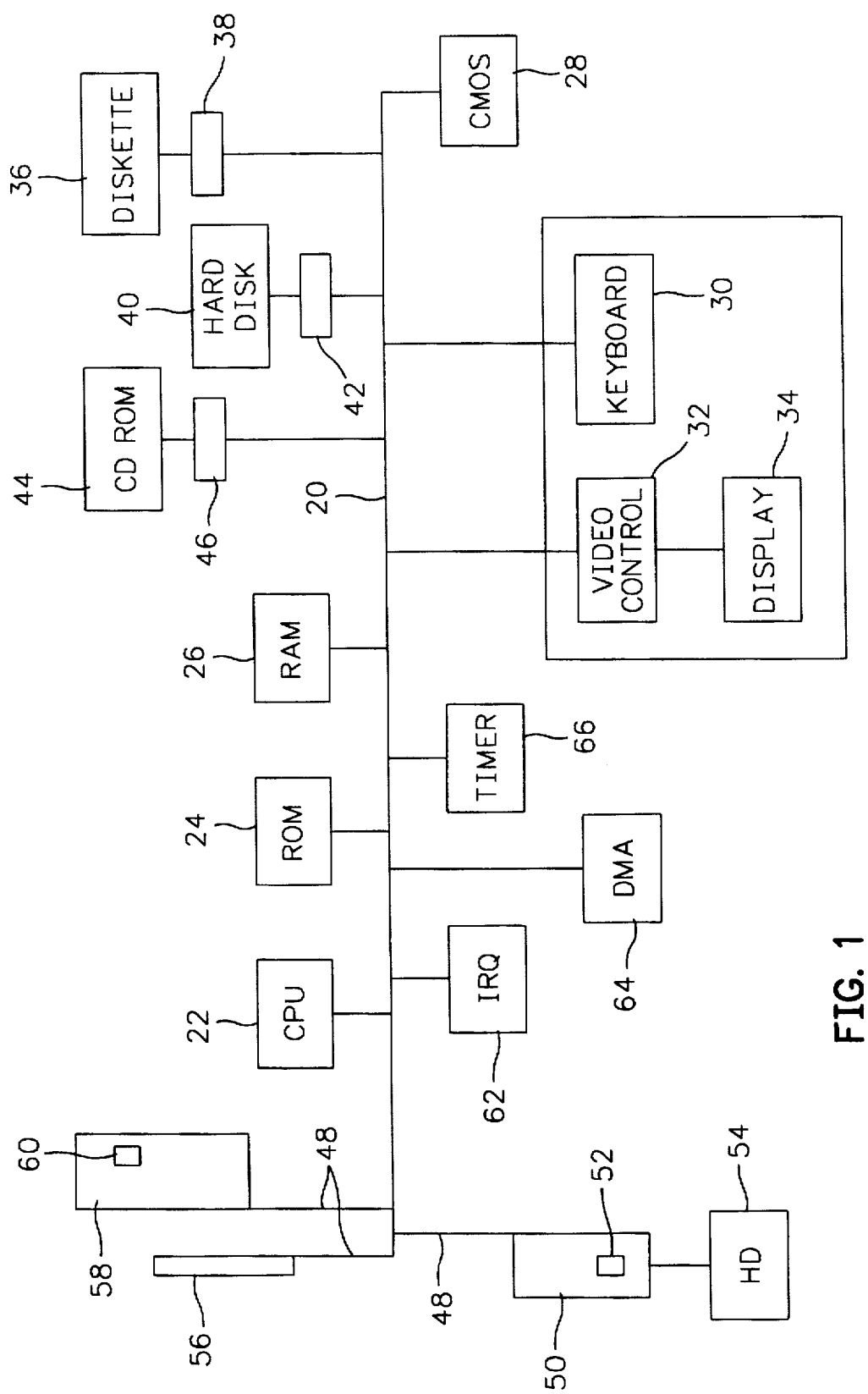
FIG. 1 is a block diagram of the hardware environment in accordance with a preferred embodiment of the invention.
Figure 2:
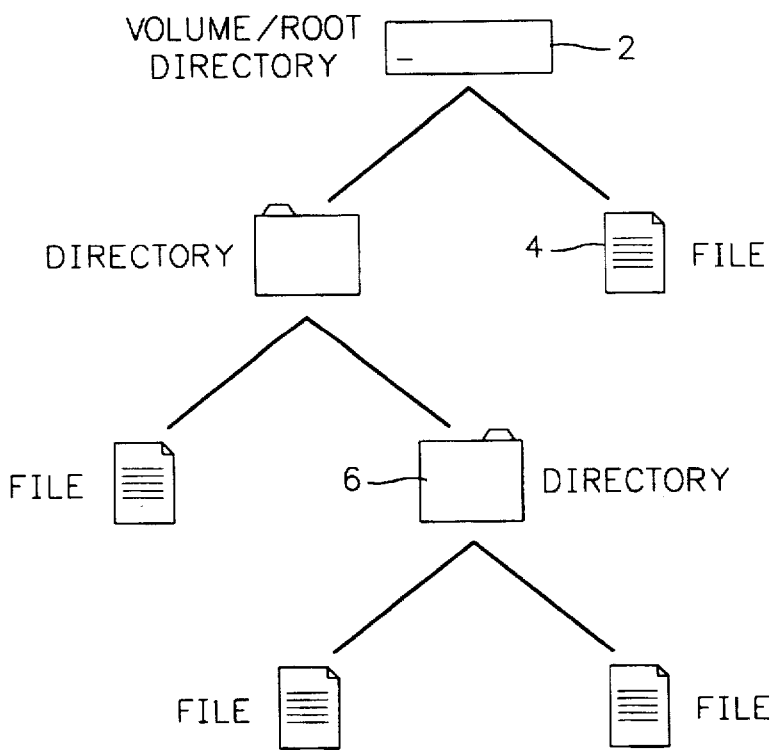
FIG. 2 is an example of a directory tree on a volume in accordance with a preferred embodiment of the invention.
Figure 3:
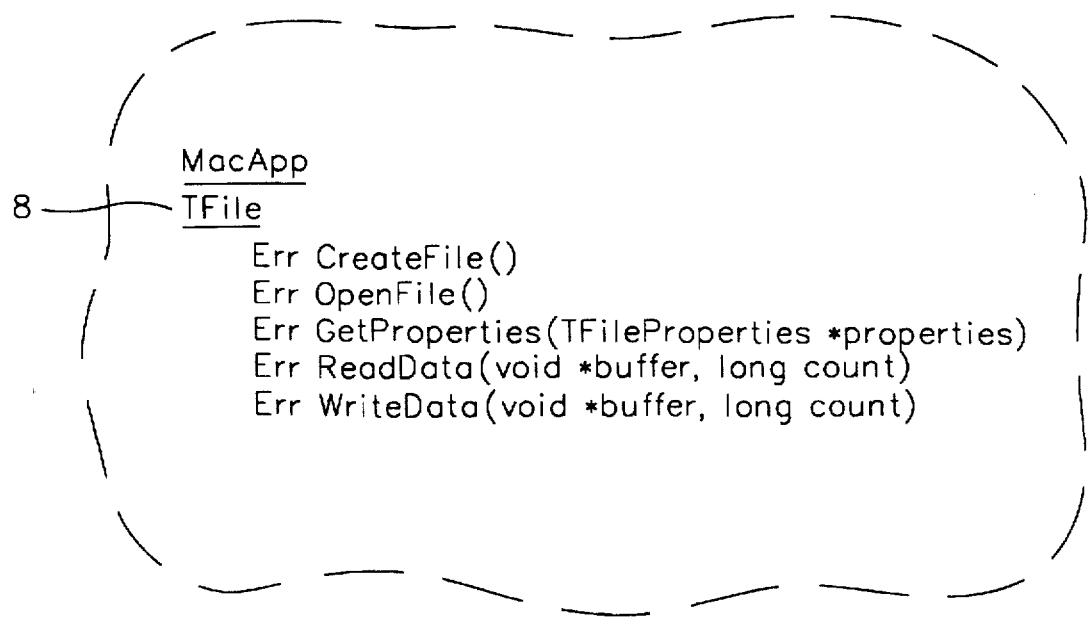
FIG. 3A–3B is an abbreviated version of the Macintosh MacApp TFile class in accordance with a preferred embodiment of the invention.

Referring now to FIG. 1, a computer system in accordance with a preferred embodiment is presented. The computer system is an exemplary computer system on which an operating system organized and configured according to the present invention operates. As such, none of the specific hardware details or organizations are considered critical but are provided merely for explanatory purposes. Many additional elements can be added and certain elements illustrated can be removed.

In the illustrated computer system, a bus 20 forms the backbone of the computer system. Attached to this bus is a Central Processing Unit (CPU) 22 which performs the processing functions of the computer system. The CPU could be a microprocessor such as the Intel 8088 or a RISC chip such as the PowerPC. The main system Read Only Memory (ROM) 24 and system Random Access Memory (RAM) 26 are connected to the system bus 20 for use by the CPU 22. In an alternate embodiment the CPU 22 and the RAM 26 are on a separate bus which is coupled to the bus 20 by means of various buffers and a bus controller. Additionally, CMOS memory 28 is connected to the system bus 20 for long term but changeable storage of specific information. As an option this can be Electrically Erasable Programmable ROM (EEPROM). A terminal is also connected to the system bus 20. The terminal typically includes a keyboard 30, a video controller 32 and a monitor/display 34 which is connected to the video controller 32. The terminal provides an operator interface to the computer system. The computer system also includes various forms of mass storage, such as a diskette drive 36 and its associated controller 38, which is connected to the system bus 20. Additionally, the preferred computer system also includes a hard disk drive 40 and its associated controller 42, which is connected to the system bus 20. Optionally, a CD-ROM drive 44 and its controller 46 can be connected to the system bus 20.

This architecture allows various sources of mass storage to be used in the computer system. Various serial and parallel ports (not shown) may also be connected to the system bus 20. An interrupt controller 62, a Direct Memory Access (DMA) controller 64 and timer 66 are connected to the system bus 20 to allow the CPU 22 to control these basic functions. The computer system includes a series of slots 48 for use by interchangeable circuit boards or adapters. The slots 48 preferably conform to certain standards, for instance the Extended Industry Standard Architecture (EISA) or MicroChannel Architecture (MCA). To support this capability, the bus 20 may actually be two or more separate buses so that CPU performance and adapter performance can be separately maximized with appropriate control and conversion circuits connecting the various buses. One exemplary adapter is a second hard disk controller 50. Preferably, the hard disk controller 50 also includes a ROM 52. The hard disk controller 50 is connected to a hard disk 54. The hard disk controller 50 may, for example, be a high performance hard disk controller such as a SCSI controller, while the hard disk 40 may be a low to medium performance hard disk provided for minimum functionality of the computer system. As another example, a tape drive 56 can be incorporated via one of the slots 48. As yet another example, a network interconnection controller (NIC) 58 may be provided in one of the slots 48. Preferably the NIC card 58 includes a ROM 60 for storing a device driver or other control code.

FIG. 8 is an overview of the class categories that comprise the file system framework with an application 63 as the client. The categories include File System 76, Properties 74, Iterators 70, File Access 66, Access Control 64, Notification 68, and Copy and Move 72. A specification for each class describing the application interface is described herein along with detailed examples of how to use the classes. Further, a class diagram is provided for the main class categories: File System, Properties, and Notification.

File System Class Framework

TFSEntity

Figure 9:
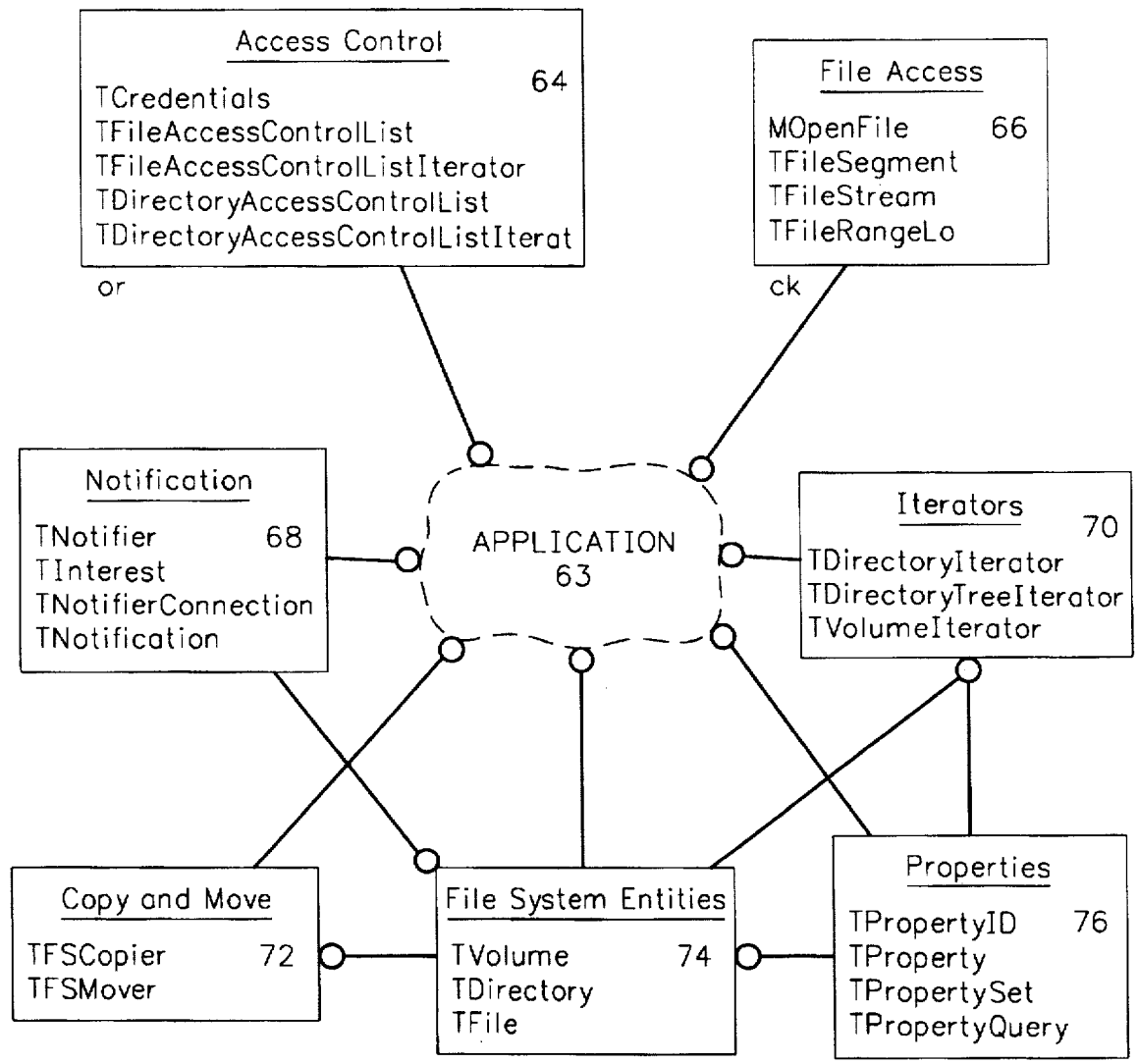
FIG. 9 is an overview of the class categories provided in the present invention in accordance with a preferred embodiment of the invention.

A class diagram of the File System class category is shown in FIG. 9 with an abstract class TFSEntity 84 being derived from abstract classes MCollectible 78 and MPropertyStore 80, and containing a TNotifier 82 object to support notification when the entity changes. TFSEntity 84 encapsulates the functions common to all file system entities from which all derived entities inherit:

TFSEntity::TFSEntity ( )

Construct an invalid TFSEntity object. The object must be assigned a valid TFSEntity before it can be used (if it is used before a valid object is assigned to it, an exception will be thrown).

TFSEntity::GetName (TFSEntityName& name) const

Return the name of this file system object.

TFSEntity::SetName (const TFSEntityName& newName)

Rename this file system object.

TTime TFSEntity::GetCreationTime ( ) const

Return the creation time stamp of this file system object.

TFSEntity::SetCreationTime (const TTime& time)

Set the creation time stamp of this file system object.

TTime TFSEntity::GetModificationTime ( ) const

Return the modification time stamp of this file system object. The time stamp reflects changes in both the properties of a file system object and it's data. Depending on the underlying file system this operation can be very expensive for directories.

TFSEntity::SetModificationTime (const TTime& time)

Set the modification time stamp of this file system object.

FileSystemEntitySize TFSEntity::GetPhysicalSizeAllocated ( ) const

The amount of physical storage allocated to this file or directory, not including the properties. For directories, all nested directories and files are included. Depending on the underlying file system this operation can be very expensive. For example, for an HFSServer, this would involve enumerating each file and nested directory within the directory acted upon.

TFSKind TFSEntity::GetFSKind ( ) const

Return the identifier for the file system kind for this file system object.

TFSEntityKind TFSEntity::GeTFSEntityKind ( ) const=0

Return the identifier for the kind of file system object that this surrogate object represents. For example, this call on a directory will return TDirectory::kKind. {Abstract→must override by subclass}

TFSKind TFSEntity::GetHomeFileSystem ( ) const=0

Return the identifier for the kind of file system that this surrogate object was created (Taligent, MS-DOS, Unix, etc.). {Abstract→must override by subclass}

Boolean TFSEntity::IsA (const TFSEntityKind& kind) const=0

Verify that this surrogate object represents a file system object of the specified type. {Abstract→must override by subclass}

Boolean TFSEntity::EstablishCredentials (TCredentials& credentials)

Establish a new authenticated principal with this TFSEntity. Every TFSEntity object returned by lookup and iterators has an authenticated principal associated with it. The call will return false and the credentials will not change if the principal does not have access permissions for the file system object represented by this TFSEntity.

TVolume TFSEntity::GetVolume ( ) const

Return an object for the volume on which this file system entity resides.

Boolean TFSEntity::HasParent (TDirectory& fillin) const

Fill in an object for the parent directory of this directory or file and return true. If the object has no parent directory ( i.e. is a volume ) return false.

TFSEntity::DeleteSelf ( )

Delete this file system entity. If this operation is successful, this object becomes invalid. If this entity is a file, it will be deleted if the caller has the correct access permissions and the file is closed. An exception will be raised if the file cannot be deleted. If this entity is a directory, all contents that can be deleted will be. If any contents remain, the directory itself will not be deleted and an exception will be raised. If this entity is a volume, all contents that can be deleted will be. If any contents remain, the volume itself will not be deleted and an exception will be raised.

TFILE

As shown in FIG. 9, the TFile class 88 is derived from the base TFSEntity 84 class and thereby derives all of the above listed member functions. The TFile class encapsulates the properties and data access functions for a file. A TFile's data accessor functions are protected and data access is provided through the TFileStream class. The TFile class also encapsulates additional public member functions that are specific to the class:

TFile::TFile ( )

Construct an invalid TFile object. The object must be assigned a valid TFile before it can be used (if it is used before a valid object is assigned to it, an exception will be thrown).

TFile& TFile::operator=

(const TFSEntity& copyFrom)

Copies the object in copyFrom into this. If copyFrom is not a TFile, this method will throw an exception.

FileSystemEntitySize TFile::GetEndOfFile ( ) const

Return the number of bytes written to this file ("logical size"—physical size is part of the base class).

TFSEntityKind TFile::GeTFSEntityKind ( ) const

Return the kind of file system object that this surrogate object represents.

Boolean TFile::IsA (const TFSEntityKind& kind) const

Verify that this surrogate object represents a file system object of the specified type.

TFile::SetAccessControlList (const TFileAccessControlList& anAccessControlList)

Set the access control list for this file to the one specified in the parameter. The call will succeed only if the TPrincipal associated with this file has kModifyAccessControlList permissions.

TFileAccessControlList TFile::GetAccessControlList ( ) const

Return the access control list for this file.

TFile::SetFileAllocationAdvice (const TFileAllocationAdvice& anAllocationAdvice)

Set the allocation Advice for this file to the one specified in the parameter.

TFileAllocationAdvice TFile::GetFileAllocationAdvice ( ) const

Return the allocation Advice for this file.

TFile::SetFileDeallocationAdvice (const TFileAllocationAdvice& anAllocationAdvice)

Sets the deallocation Advice for this file to the one specified in the parameter.

TFileAllocationAdvice TFile::GetFileDeallocationAdvice const ( )

Return the deallocation Advice for this file.

TDirectory

The TDirectory 86 shown in FIG. 9 is derived from the TFSEntity 84 class and is associated with the TFile 88 class since directories contain files. The TDirectory 86 inherits the properties and member functions of the TFSEntity 84 class, and provides member functions specific to the class:

TDirectory::TDirectory

Construct an invalid TDirectory object. The object must be assigned a valid TDirectory before it can be used (if it is used before a valid object is assigned to it, an exception will be thrown).

TDirectory& TDirectory::operator=

(const TFSEntity& copyFrom)

Copies the object in copyFrom into this. If copyFrom is not a TDirectory, this method will throw an exception.

FileSystemEntitySize TDirectory::GetMemberCount const ( )

Returns the number of file system objects in this directory. It does not include the objects nested within a sub directory.

TFSEntity TDirectory::LookUp (const TPropertyQuery& query) const

If any file system object satisfying the query exists in this directory, LookUp returns the surrogate object for it, otherwise throws an exception. Since name is a property and can be used to construct the query, this function can be used to look up the named file system object and to receive a surrogate for the same. If more than one exists, only the first file system object that satisfies the query is returned. The same ordering is applied that is used in TDirectoryIterator.

TFSEntity TDirectory::LookUp (const TPropertyQuery& query, TPropertySet& fillin) const This function provides the same functionality as the one mentioned above; additionally it retrieves the specified properties for the file system entity.

TFSEntity TDirectory::TreeLookUp (const TPropertyQuery& query) const

If a file system object satisfying the query exists in this directory or any of its sub directories, LookUp returns the surrogate object for it otherwise throws an exception. Since name is a property and can be used to construct the query, this function can be used to look up the named file system object and to receive a surrogate for the same.

TFSEntity TDirectory::TreeLookUp (const TPropertyQuery& query, TPropertySet& fillin) const This function provides the same functionality as the one mentioned above; additionally it retrieves the specified properties for the file system entity.

TDirectory TDirectory::CreateDirectory (const TFSEntityName& directoryName, const TPropertySet& initialProperties=kNoProperties, FileSystemEntitySize initialMemberCount=0)

Create a directory within this directory with the specified name. InitialMemberCount is a hint to the file system about the expected number of file system objects in this directory. InitialProperties are assigned to the newly created directory. If initial properties are not specified, the file system will use default values for the system-defined properties. (See the section on the file system defined properties for the description of these default values.)

TFile TDirectory::CreateFile (const TFSEntityName& fileName, const TPropertySet& initialProperties=kNoProperties, FileSystemEntitySize initialMinimumPhysicalSizeAllocated=0)

Create a file within this directory with the specified name. The file system will allocate InitialMinimumPhysicalSizeAllocated bytes of storage to this file; an exception is raised if the allocation fails. InitialProperties are assigned to the newly created file. If initial properties are not specified, the file system will use default values for file system properties. (See the section on file system properties for the description of these default values.)

TDirectory::DeleteAllContents

Delete all file system objects contained in this directory. Sub directories of this directory will be traversed and deleted. If any files are open, an exception will be raised after all non-open files have been deleted otherwise this directory will be left empty.

TFSEntityKind TDirectory::GeTFSEntityKind const ( )

Return the kind of file system object that this surrogate object represents.

Boolean TDirectory::IsA (const TFSEntityKind& kind) const

Verify that this surrogate object represents a file system object of the specified type.

TDirectory::SetAccessControlList (const TDirectoryAccessControlList&)

Sets the access control list for this directory to the one specified in the parameter. The call will succeed only if the TPrincipal associated with this directory has kModifyAccessControlList permissions.

TDirectoryAccessControlList TDirectory::GetAccessControlList ( ) const

Returns the access control list for this directory.

TVolume

As shown in FIG. 9, the TVolume class 90 is derived from the TDirectory class 86 since a volume is also the root directory 2 as shown in FIG. 1. A volume is also considered a storage device, and it contains member specific functions:

TVolume::TVolume ( )

Construct an invalid TVolume object. The object must be assigned a valid TVolume before it can be used (if it is used before a valid object is assigned to it, an exception will be thrown).

TVolume& TVolume::operator=

(const TFSEntity& copyFrom)

Copies the object in copyFrom into this. If copyFrom is not a TVolume, this method will throw an exception.

TVolume::Unmount (Boolean eject=TRUE)

Unmount this volume. If the call succeeds, this object becomes invalid. For any removable media, if eject is true, the disk backing the volume will be ejected. If the eject fails, an exception is thrown. (For fixed disks, eject is ignored.) The volume cannot be unmounted, and an exception is thrown if it is busy; for example, if any files stored on the volume are still open.

TVolume::TakeOffline ( )

Eject removable media. Taking an off-line volume off-line or taking a fixed disk off-line have no effect. Removable media that is taken off line will be brought on-line if possible on next access. The mechanism for this includes putting up a dialog box indicating which disk is required and blocking clients needing that disk until it is available.

TVolume::BringOnline ( )

Bring this volume back on-line. Bringing a volume on-line that is currently on-line has no effect. An exception is thrown if the volume could not be brought on-line. Volumes are brought back on-line by putting up a dialog box indicating which disk is required and blocking clients needing that disk until it is available.

Boolean TVolume::IsOnline ( ) const

If the volume is on-line, return true.

Boolean TVolume::HasDeviceID (TDiskID& fillin)

Fill in the storage identifier object associated with this volume and return true. Some volumes may not be accessed at the device level and will return false.

TFSEntityKind TVolume::GeTFSEntityKind ( ) const

Return the kind of file system object that this surrogate object represents.

TVolume::GetPossibleFSNames (TPropertyIDSet& fillin) const

Since the file system of the present invention is compatible with foreign file systems, this member function returns a list of all the identifiers by which a file or directory might be known on this volume.

TVolume::IndexProperty (const TPropertyID& property)

Declare that the named property will often be used in queries against the files stored on this volume. This notice will cause queries against the property to be accelerated, typically by creating a secondary index on the property. The property must be a user-defined property. An exception will be raised if the property cannot be indexed.

TVolume::DoNotIndexProperty (const TPropertyID& property)

Declare that the named property will no longer be used in queries against the files stored on this volume. The specification for the property classes disclosed herein describes the function of indexes used in queries.

FileSystemEntitySize TVolume::GetFreeSpace ( ) const

Return the amount of free space on this volume in bytes.

FileSystemEntitySize TVolume::GetTotalSpace ( ) const

Return the size of this volume in bytes.

Boolean TVolume::IsLocal ( ) const

Return true if this volume is directly connected to this machine. Return false if this volume is accessed via the network.

Boolean TVolume::IsFixed ( ) const

Return true if this volume may not, under normal use, be removed by the user. "Normal use" does not include powering off hard disks or breaking network connections.

In addition to member functions, there is a set of system defined properties associated with each file system entity. Objects such as a file's name, modification date and size are considered properties, whereas the contents of the file are unkown to the file system and is not considered a property. Some properties can be modified (mutable), while others cannot (immutable). The following table lists the name, type and mutability of the system properties associated with each file system entity.

| Property Name | Type | Mutable | Entity |
| --- | --- | --- | --- |
| "Name" | TFSEntityName | yes | All |
| "CreationTime" | TTime | yes | All |
| "ModificationTime" | TTime | yes | All |
| "Entity Kind" | TFSEntityKind | no | All |
| "Home File System" | TFSKind | no | All |
| "Physical Size All . . . " | FileSystemES | no | All |
| "Packaged" | Boolean | no | All |
| "End Of File" | FileSystemES | no | TFile |
| "Open File" | Boolean | no | TFile |
| "File Access . . . " | TFileAccessCL | yes | TFile |
| "File Allocation . . . " | TFileAA | yes | TFile |
| "File Deallocation . . . " | TFileDA | yes | TFile |
| "Member Count" | FileSES | no | TD, TV |
| "Directory Access . . . " | TDirectoryACL | yes | TD, TV |
| "Total Space" | FileSES | no | TVolume |
| "Free Space" | FileSES | no | TVolume |
| "Local" | Boolean | no | TVolume |
| "Fixed" | Boolean | no | TVolume |
| "Read Only" | Boolean | no | TVolume |

Name

The name given to the file system entity (no creation default value).

CreationTime

The time at which the file system entity was created. A copy of this entity will retain the original creation time (creation default is current time).

ModificationTime

The time at which the file system entity was last modified. For directories, this reflects all nested directories and files. A copy of this entity will retain the original modification time (creation default is current time).

EntityKind

Specifies whether the entity is a volume, directory or file (creation default determined by what entity is being created).

HomeFileSystem

Names the file system from which the entity originated (creation default is "Taligent").

PhysicalSizeAllocated

The amount (in bytes) of physical storage allocated to the file or directory, not including properties. For directories, all nested directories and files are included (creation default is zero).

Packaged

Indicates whether the entity is "packaged" for a foreign file system (creation default is false).

EndOfFile

The number of bytes written to the file (creation default is zero).

OpenFile

The data access state of this file; true if open for data access (creation default is false).

FileAccessControlList

The access permissions for the file (creation default is universal access and rights).

FileAllocationAdvice

The allocation advice for the file (creation default the ChunkSize value is determined by the file system, acceptable read/write time is kPositiveInfinty, and allowSparness is true.

FileDeallocationAdvice

The deallocation advice for the file (creation default is EraseOnDeallocation and fileWillReuseStorage are set to false).

MemberCount

The number of files and directories contained in the directory not including the member count of nested directories or their contents (creation default is zero).

DirectoryAccessControlList

The access permissions for the directory (creation default is universal access and rights).

TotalSpace

The amount of storage, in bytes, on the volume (creation default is the size of the volume).

FreeSpace

The amount of storage, in bytes, that is unallocated on the volume (creation default is the remaining space after all initial file system structures have been allocated).

Local

Indicates whether or not this volume is directly connected to this machine. The value will be true for any volume accessed via a "local" bus (SCSI, etc.); the value will be false for volumes accessed via a network (creation default is not applicable).

Fixed

Indicates whether or not this volume may, under normal use, be removed by the user at runtime. "Normal use" does not include powering off hard disks or breaking network connections (creation default is n/a).
ReadOnly
Indicates whether or not the volume is read-only (creation default is n/a).

In addition to the above listed system defined properties, a file system entity may also have user defined properties. User defined properties provide the ability to customize file system entities in order to achieve a specific goal, such as interoperability with a foreign file system, without having to change the basic operation of the file system.

Figure 10:
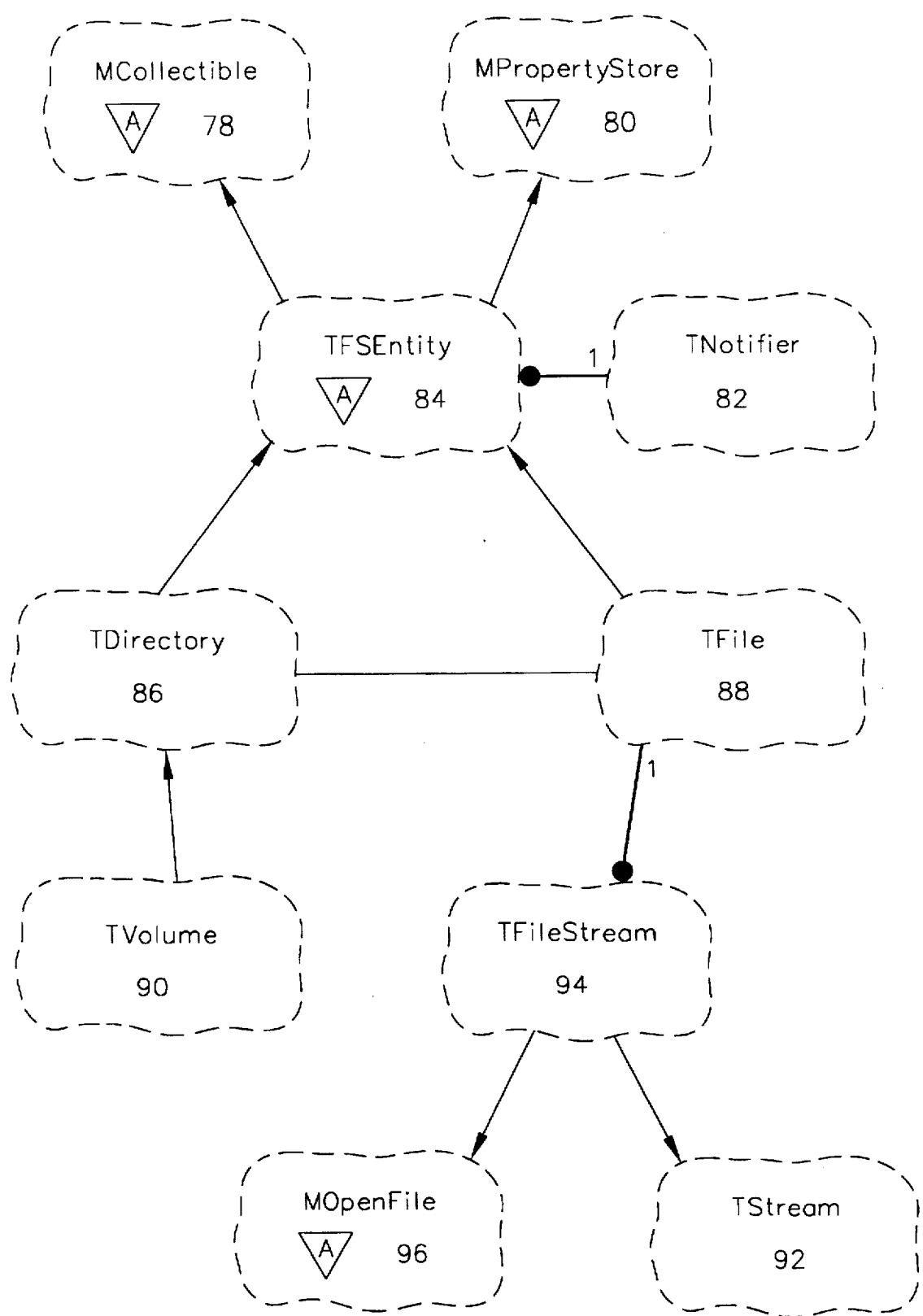
FIG. 10 is a class diagram for the file system entity category in accordance with a preferred embodiment of the invention.

A category of property classes 76 is provided in the present invention for creating and manipulating the file system properties, as well as enable a user to perform complex searches and retrieval. A class diagram of the property classes is shown in FIG. 10. Each property is instantiated from a TProperty 106 class or a subclass derived therefrom. Two of the property classes, TPropertyIDSet 100 and TPropertySet 102, provide the ability to allow batch storage and retrieval on sets of heterogeneous objects, such as files and directories, without having to provide any special protocol. Also, a special TPropertyQuery 116 class along with a TIterator 70 are provided for performing property searches and retrieval, and, as with the property class, the query class can be modified and extended to provide custom searches. Further, polymorphism is implemented using a polymorphic getter function for user defined file system properties. The base TFSEntity 84 class is derived from an abstract MPropertyStore 118 class for storing and retrieving the file system entity properties.

TProperty

As shown in FIG. 10, the TProperty class 106 is derived from the MCollectible class 98 since properties are collected into MPropertyStore 118 objects such as a TFSEntity. Each property has an associated TPropertyID 104 for identifying the property's name and type. Storing, retrieving, and searching are actually based on the TPropertyID 104, whereas the TProperty 106 provides functions for comparing, assigning, and returning the property value. Two template classes, TPrimitiveProperty<ABasicType>114 and TExtendedProperty<AClassType>110, are derived from TProperty 106 and implement primitive data type properties and extended data type properties respectively. The base functions provided by the TProperty 106 class are:

TProperty::TProperty
 ( )
  Construct a default property. Will match kInvalid.
TProperty::TProperty
 (const TPropertyID& id)
  Construct a property with an invalid value.
TProperty::TProperty
 (const TProperty& copy)
  Construct a property with the contents of the argument. No run-time type check is performed.
TProperty& TProperty::operator=
 (const TProperty& right)
  Assign the contents of the argument to this object. No run-time type check is performed.
Boolean TProperty::IsSameType
 (const TProperty& right) const
  Return true if the type represented by the argument is equivalent to that of this object, otherwise return false.
TProperty::operator TPropertyID
 ( ) const
  Return the property identifier. This operator allows you to pass a TProperty object to any function that takes a TPropertyID.

TPropertyID TProperty::GetID
 ( ) const
  Return the property identifier.
Boolean TProperty::HasValidValue
 ( ) const
  Return true if this object contains a valid value, otherwise return false.
Boolean TProperty::operator ==
 (const TPropertyID&) const
  Return true if argument is equal to the identifier component of this object, otherwise return false.
Boolean TProperty::operator !=
 (const TPropertyID&) const
  Return true if argument is not equal to the identifier component of this object, otherwise return false.
Boolean TProperty::operator ==
 (const TProperty&) const
  Return true if argument is equal to this object, otherwise return false.
Boolean TProperty::operator !=
 (const TProperty&) const
  Return true if argument is not equal to this object, otherwise return false.

TPrimitiveProperty and TExtendedProperty

Properties can be operated on at an abstract level (i.e. the TProperty level) to perform logical comparisons of the property IDs or the properties as objects, but must be operated on at a lower subclass level to manipulate property values. Property values are either primitive types such as characters or integers, or extended types such as an instance of a class. There are two template classes, TPrimitiveProperty<ABasicCType> 114 and TExtendedProperty<AClassType> 110, for representing primitive and extended types respectively.

The constructors for these subclasses are the similar to the parent class, except a default value can be specified. A property value can also be set by assigning properties, that is, a property without a value is given the value of an assigned property. There are also functions and operators for returning the value of a property.

TPropertyID

Every property has a TPropertyID 104 object associated with it to identify the property when it is retrieved. A TPropertyID 104 encapsulates a name/type pair, where "name" is user defined and "type" represents the type of the property's value. Two template classes, TPrimitivePropertyID<ABasicCType> 114 and TExtendedPropertyID<AClassType> 110, are derived from TPropertyID 106 and implement primitive data type properties and extended data type properties respectively. The base functions provided by the TPropertyID 104 class are:

TPropertyID::TPropertyID
 ( )
  Construct a default property identifier. Will match kInvalid.
TPropertyID::TPropertyID
 (const TPropertyID& copy)
  Construct a property identifier with the contents of the argument. No run-time type check is performed.
TPropertyID& TPropertyID::operator=
 (const TPropertyID& right)
  Assign the contents of the argument to this object. No run-time type check is performed.
Boolean TPropertyID::operator ==
 (const TPropertyID&) const
  Return true if argument is equal to this object, otherwise return false.

Boolean TPropertyID::operator !=
   (const TPropertyID&) const
   Return true if argument is not equal to this object, otherwise return false.
Boolean TPropertyID::IsSameType
   (const TPropertyID& right) const
   Return true if the type represented by the argument is the same as that of this object, otherwise return false.
TPropertyID::GetName
   (TPropertyName& fillin) const
   Return the name of this identifier.
TPropertyQuery TPropertyID::Exists
   ( ) const
   Return a property query object which, when evaluated, will check for the presence of the property named by this object.
TPrimitivePropertyID and TExtendedPropertyID Property IDs can be operated on at an abstract level (i.e. the TPropertyID 104 level) such as comparing the IDs during search and retrieval, but must be operated on at a lower subclass level to compare the property values. Two template classes, TPrimitivePropertyID<ABasicCType> 112 and TExtendedPropertyID<AClassType> 108, implement property IDs for primitive and extended data types respectively. These subclasses provide the queries for comparing the property values. For instance, the operator == returns a query that when evaluated, will compare the property value to a specified value.
TPropertySet and TPropertyIDSet TPropertyIDSet 100 collects objects of type TPropertyID 104 and is used primarily to delete multiple properties from an MPropertyStore 118 in a single operation. TPropertySet 102 collects objects of type TProperty 106 and is used primarily to read and write multiple properties. Both collections have functions for adding and deleting members in the set. There are also conversion operators for constructing one type of collection out of the other type, and for adding members from the other type of collection.
TPropertyQuery Property queries (TPropertyQuery 116) are used as a filter when iterating over a collection of MPropertyStore 118 objects. Clients of the property classes provide MPropertyStore 118 iterators for iterating through a collection of objects. For instance, the file system is a client of the property classes. A TPropertyQuery 116 and a TDirectoryIterator 70 might be used to select only files whose modification data is greater than a specified date. The examples provided herein further illustrate the use of property queries.
TDirectoryIterator, TDirectoryTreeIterator and TVolumesIterator The file system framework provides a class category of iterators 70 for traversing through a set of file system entities. TDirectoryIterator 70 provides an iterator over the files and directories contained in a directory, but does not iterate over the subdirectories. TDirectoryTreeIterator 70 provides an iterator over the files and directories contained in a directory, and includes the subdirectories. TVolumesIterator 70 provides an iterator over all mounted volumes.

The iterators are normally used to search for file system entities using either a TPropertySet 102, TPropertyIDSet 100, or a TPropertyQuery 116. Besides the constructor and destructor methods, methods are provided for searching for the first and next file system entity that matches the property set or query. When searching with a directory iterator, the principle used to access the entities within a directory or subdirectory is the principle associated with the target directory, whereas for searching volumes, the TCredentials for the current user must be specified when creating the TVolumesIterator (access control is discussed bellow).
MPropertyStore and MCollectible TFSEntity 84 is subclassed from both MPropertyStore 118 and MCollectible 78 through multiple inheritance. MPropertyStore 118 is an abstract class which provides the protocol for storing and retrieving properties such as the properties of file system entities. There are functions for manipulating single TProperty 106 or TPropertyID 104 objects, or objects in a set using TPropertySet 102 or TPropertyIDSet 100. There are also functions for executing queries using a TPropertyQuery 116 class.

MCollectible 78 is an abstract class for an object which is collected into a set such as collecting file system entities into a set. The MCollectible 78 class also facilitates "flattening" objects into a TFileStream 94 (using >>= operator) for storing file system entities to a storage device, and facilitates "resurrecting" objects from a TFileStream 98 (using <<= operator) when reading file system entities from a storage device.
TFileStream and TFileRangeLock File access is achieved using a TFileStream 94 class which is subclassed from a TStream 92 class and an abstract MOpenFile 96 class. Streams provide a stream-of-bytes interface for objects, making it easier to read and write objects. The TStream 92 class provides a convenient general means for accessing file data, including methods for reading and writing primitive data types such as bytes, integers, and characters, and for reading and writing other extended data types such as objects. The TFileStream 94 subclass provides an additional performance enhancing function TFileStream::AdviseSequential. AdviseSequential is used to advise the stream that it will be accessed in a sequential manner which may help the file system get optimal performance during reads or writes of file data.

The MOpenFile 96 class provides a surrogate object for a named file that is opened for access. When a TFileStream 94 is created, it is initialized with a TFile 88 passed to the creator function. The TFile 88 is opened with access permissions such as read exclusive, write exclusive, read shared, write shared, etc., that are also passed to the creator function of TFileStream 94. The TFileStream 94 class uses the TFile 88 to access the file data as shown in FIG. 7, except the TFile 88 of the present invention does not make the additional procedure call 62 because the procedure is incorporated into the TFile 88 class.

Figure 11:
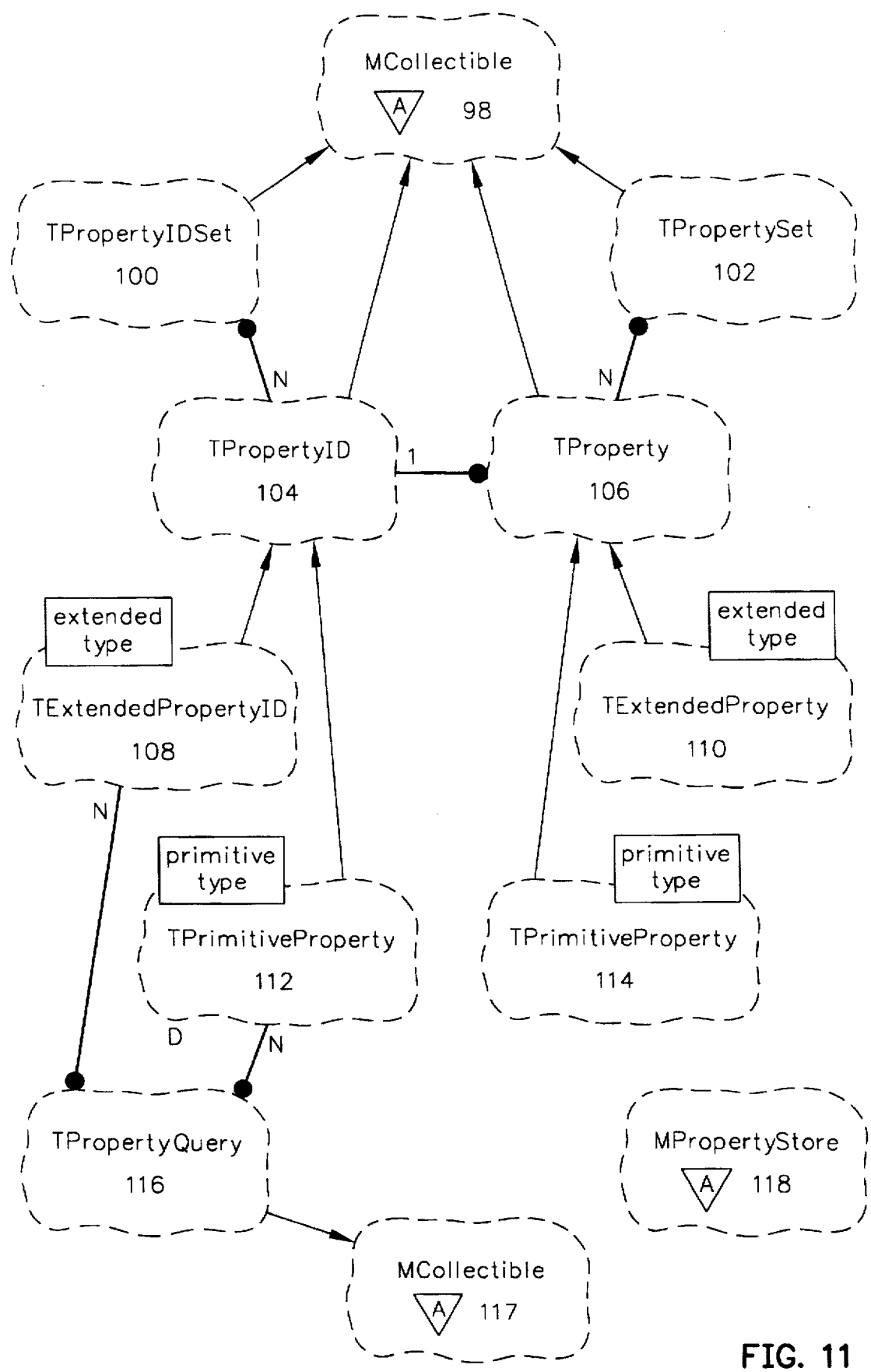
FIG. 11 is a class diagram for the properties category in accordance with a preferred embodiment of the invention.

The TFileRangeLock 66 class provides a method for locking a range of bytes within a file stream. The types of locks provided are for exclusive reading, exclusive writing, or both. The file stream, lock range, and lock type are specified when the TFileRangeLock 66 is created.
TNotifier A class category of notification classes is shown in FIG. 11. Every TFSEntity 84 contains a TNotifier 126 member for notifying clients when the object changes. TNotifier 126 is subclassed from an abstract MNotifier 120 mix-in class that provides the protocol for accepting connections to other objects (clients) interested in receiving notifications and for distributing notifications to the interested clients. Clients interested in being notified when a file system entity changes use a TNotifierConnection 132 object to connect to the entity's TNotifier 126. The client specifies a TInterest 134 when making the connection, where TInterest 134 specifies the file system entity and the change the client is interested in. When a change of interest occurs, the file system entity notifies interested clients through its TNotifier 126, and returns a TNotification 136 object to the clients. The TInterests 134 and TNotifications 136 provided by the file system are:

TFSDeletionInterest/TFSDeletionNotification

Use TFSDeletionInterests for notification of the deletion of file system entities. TFSDeletionNotification objects are returned as a result of the deletion of a file system entity registered for notification.

TFSPropertyInterest/TFSPropertyNotification

Use TFSPropertyInterest for notification of changes to properties. TFSPropertyNotification objects contain the interest, event and property associated with the entity.

TFSContentsPropertyInterest/TFSContentsPropertyNotification

Use TFSContentsPropertyinterest to receive notification on changes to properties associated with entities contained in a directory. TFSContentsPropertyNotification objects are returned as a result of the event specified by TFSContentsPropertyInterest.

NOTE: This interest returns notification only for changes to the immediate children of the directory.

TFSVolumeContentsPropertyInterest/FSVolumeContentsPropertyNotification

TFSContentsPropertyInterest applies only to its immediate children (not recursively throughout a sub-tree), while TFSVolumeContentsPropertyInterest provides notification of property changes for any entity on the specified volume. TFSContentsPropertyNotification objects are returned as a result of the event specified by TFSVolumeContentsPropertyInterest.

TFSContentsInterest/TFSContentsNotification

Use TFSContentsInterest to receive notification on creation and deletion of file system entities on a given directory, and on the moving of file system entities into or out of the directory. TFSContentsNotification objects are returned as a result of the event specified by TFSContentsInterest.

TFSVolumeContentsInterest/TFSVolumeContentsNotification

Use TFSVolumeContentsInterest to receive notification on creation and deletion of file system entities on a given volume, and on the moving of file system entities within the volume. TFSContentsNotification objects are returned as a result of the event specified by TFSVolumeContentsInterest.

TFSVolumeInterest/TFSVolumeNotification

Use TFSVolumeInterest to receive notification of a specified volume unmounting, going on-line or off-line. TFSVolumeNotification objects are returned as a result of the event specified by TFSVolumeInterest.

TFSAllVolumesInterest/TFSAllVolumesNotification

Use TFSAllVolumeInterest to receive notification of volumes mounting, unmounting, going on-line or off-line. TFSAllVolumesNotification objects are returned as a result of the event specified by TFSAllVolumeInterest.

TCredentials and TAccessControlList

User authentication is implemented using a TCredentials 64 class. When a user logs onto a system, the local authentication service prompts for a user ID and password. If the user enters the correct ID and password, a TCredentials 64 object is created which represents a new authenticated principle (user). The TCredentials 64 object is subsequently used to access file system entities.

File system TDirectories 86, TFiles 88, and subclasses therefrom (TVolumes 90) encapsulate a TAccessControlList 64 for implementing protection domains. An access control list contains a set of {Principle, Rights}, where the rights define the access rights (read, write, execute, etc.) for the specified principle. A principle will only "see" those file system entities which have granted access rights to the principle.

Every file system surrogate object encapsulates a TCredentials 64 object and associated principle. The member function TFSEntity::Establish(TCredentials credentials) is used to establish a new principle with the file system entity. If the principle does not have access rights to the file system entity, the TCredentials 64 will not change, and the function will return false. If the principle has access rights to the file system entity, the TCredentials 64 for the entity will be reassigned, and subsequent file access (read, write, etc.) will be restricted by the rights as defined for the principle in the TAccessControlList 64.

An example of an Access Control List for several files is shown in FIG. 4. Each ACL entry specifies a principle (user id) and the allowed access (Read, Write, execute). An asterisk means all principles. In FIG. 4, File1 16can be accessed with read/write rights only by user1. File2 18 can be accessed with read rights by user1, with read/write rights by user2, and with execute rights by user3. File3 20 can be accessed with execute rights by user1, and with write rights by user3. Other examples provided herein further illustrate using TCredentials 64 and TAccessControlLists 64.

Interoperability

Working with files from a "foreign" file system running under a different operating system is called interoperability. Interoperability is achieved in the present invention by "packaging" files into formats compatible with the various file systems. For example, before a file created on an MS-DOS system is transported to a volume of the present invention, the file is packaged into a compatible format and the MS-DOS properties stored with the packaged file. When the file is transported back to the MS-DOS file system, the file is unpackaged and the MS-DOS properties are restored. Similarly, a file created on a volume of the present invention is packaged before being transported to a foreign file system in order to retain the home file system properties. The home file system properties are restored when transporting the file back from the foreign file system.

FILE SYSTEM EXAMPLES

The following examples further illustrate the embodiments of the present invention. Each example describes the sequence of events as illustrated in an object diagram. The links between objects as shown in FIG. 5 are depicted with an order:message(param) 44 adornment for each reference number in the object diagram. Objects returned by a called object are depicted by an open circle arrow 46.

Delete Big Files I

Figure 12:
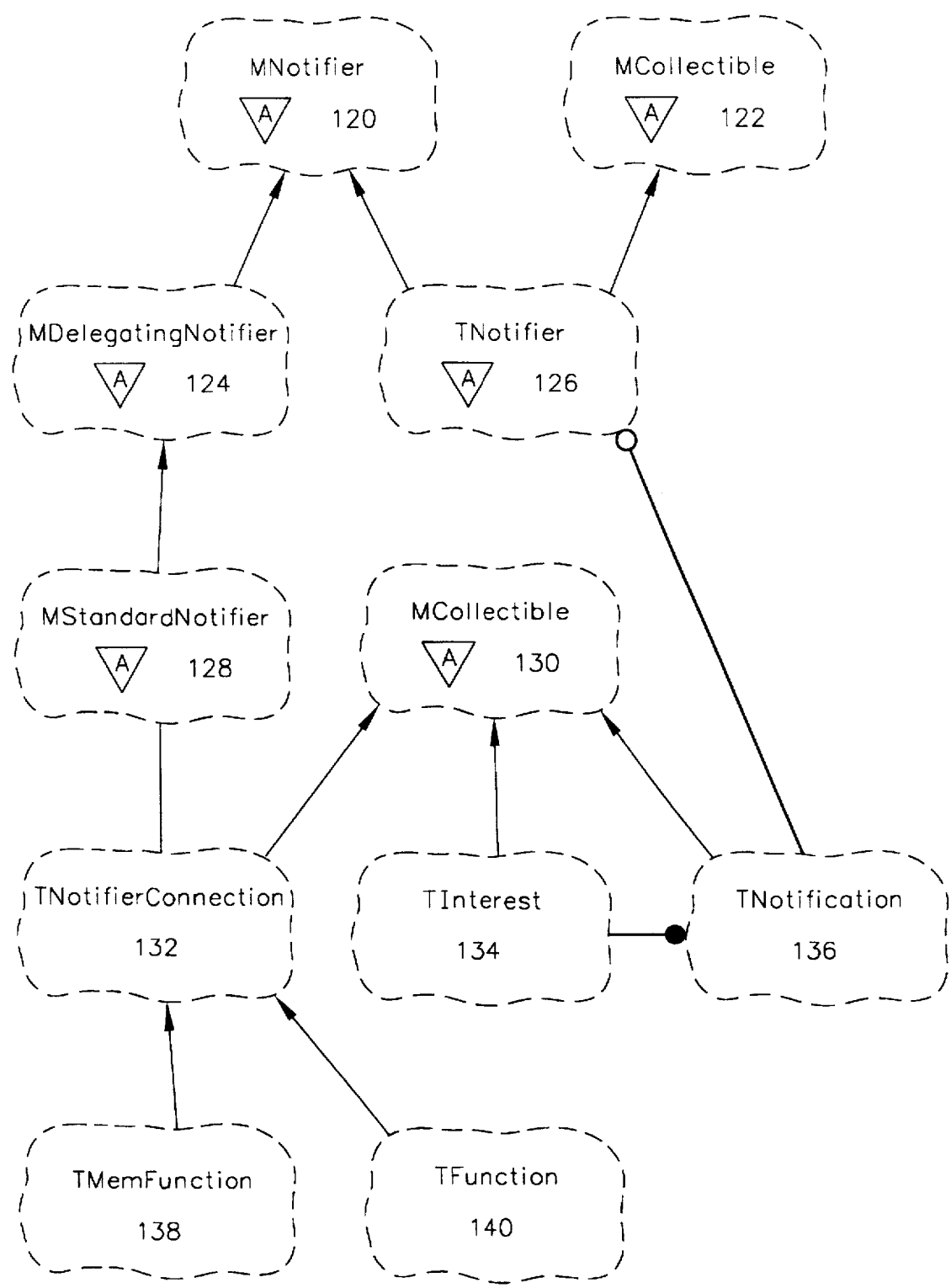
FIG. 12 is a class diagram for the notification category in accordance with a preferred embodiment of the invention.

In this example as shown in FIG. 12, all of the files with a size property greater than a given value are deleted from a specified directory (not including the subdirectories). The sequence of events is as follows:

1:DeleteBigFiles(directory, bigFileSize) 154

The application 142 calls this member function specifying the directory and the bigFileSize of which all files with a size property greater than the size specified are deleted from the directory.

2:Add(TProperty(TFSEntity::kEntityKind))/Add(TProperty (TFile::kEndOfFile)) 158

A local TPropertySet 144 is created and a first local TProperty(TFSEntity::kEntityKind) and a second local TProperty(TFile::kEndOfFile) are added to the set. TFSEntity::kEntityKind is an extended property representing a file system entity kind, and TFile::kEndOfFile is a primitive property representing the size of a TFile (data size).

3:TDirectoryIterator(directory, propertySet) 162

A local TDirectoryIterator 148 is created and initialized with the directory from which files are to be deleted, and the TPropertySet 144. The TPropertySet 144 serves two purposes. First, it specifies the properties being searched for, that is, the TDirectoryIterator 148 will only return file system entities having a TFSEntity::kEntityKind and a TFile::kEndOfFile property.

Second, the properties in the file system entity returned by the TDirectoryIterator 148 are assigned to and returned in the properties in the TPropertySet 144.

4:First( ) 164

A message is sent to the TDirectoryIterator 148 to return the first TFSEntity 166 in the directory.

5:Get(entityKindProperty)/Get(fileSizeProperty) 156

At this point, the TPropertySet 144 contains the properties of the file system entity returned by the TDirectoryIterator 148 as a result of the call to 4:First( ). Two local properties, entityKindProperty and fileSizeProperty 160, are used to read the corresponding properties from the TPropertySet 144.

6:GetValue( ) 168

A first local variable, fileKind 170, is used to read the value from the entityKindProperty 150.

7:GetValue( ) 174

A second local variable, fileSize 176, is used to read the value form the fileSizeProperty 152.

8:DeleteSelf( ) 172

If the fileKind 170 is equal to TFile::kKind, and the fileSize 176 is greater than bigFileSize, then the TFile 146 is deleted.

9:Next( ) 164

A message is sent to the TDirectoryIterator 148 to return the next TFSEntity 166 in the directory.

Steps 5 through 9 are repeated for all file system entities in the directory.

DeleteBigFiles II

Figure 13:
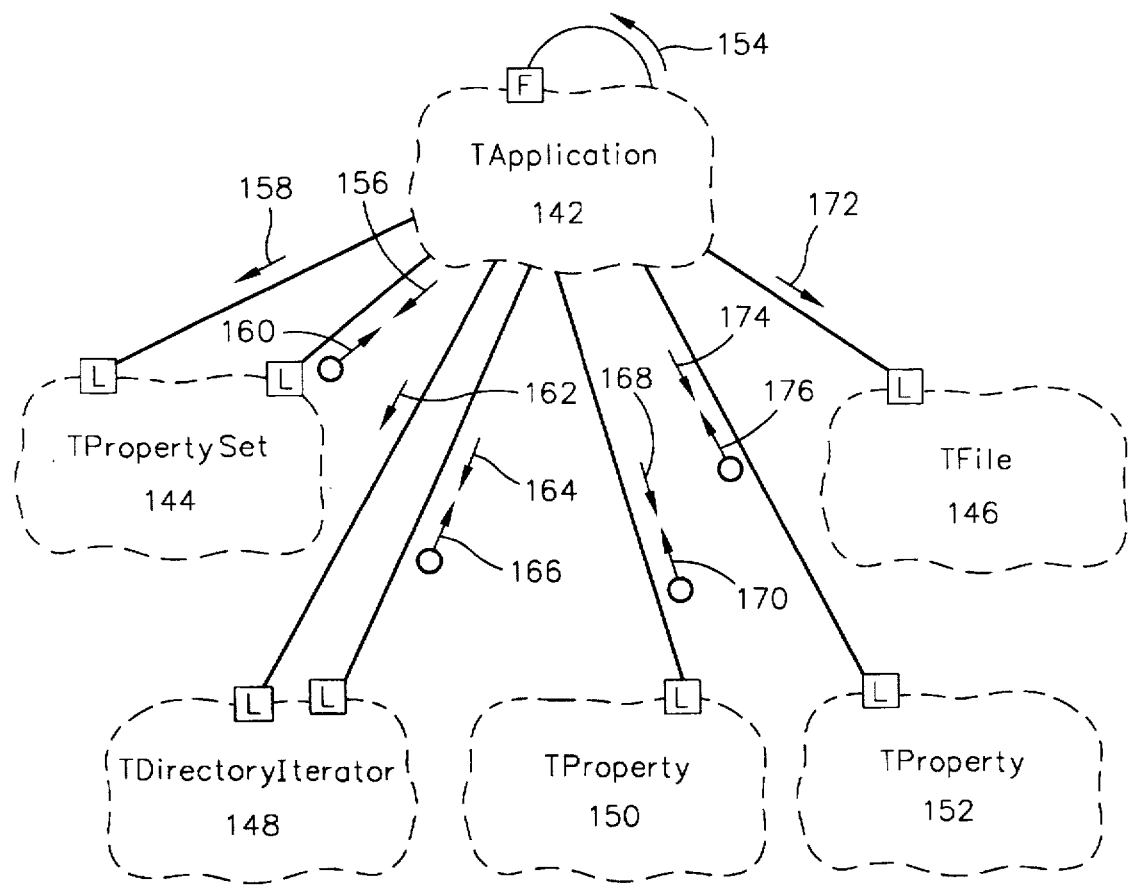
FIG. 13 shows how to delete files from a directory based on a specific file property in accordance with a preferred embodiment of the invention.

This example is shown in FIG. 13 and performs the same function as the previous DeleteBigFiles I, except a TPropertyQuery 156 is used in conjunction with the TDirectoryIterator 158. The sequence of events is as follows:

1:DeleteBigFiles(directory, bigFileSize) 186

The application 178 calls this member function specifying the directory and the bigFileSize of which all files with a size property greater than the size specified are deleted from the directory.

2:TPropertyQuery=(TFSEntityKind == TFile::kKind && TFile::kEndOfFile>bigFileSize) 188

A local fileFilter 190 of type TPropertyQuery 180 is created and initialized with a query to search for file system entities of TFile::kKind, and for files with a TFile::kEndOfFile property value greater than bigFileSize.

3:TDirectoryIterator(directory, fileFilter) 192

A local TDirectoryIterator 184 is created and initialized with the directory from which files are to be deleted, and the fileFilter 190. The TDirectoryIterator 184 will search for and return file system entities that match the fileFilter 190 query.

4:First( ) 194

A message is sent to the TDirectoryIterator 184 to return the first TFSEntity 196 in the directory that matches the fileFilter 190 query.

5:DeleteSelf( ) 198

Delete the TFSEntity 196 (always a TFile 182) returned by the TDirectoryIterator 184.

6:Next( ) 194

A message is sent to the TDirectoryIterator 184 to return the next TFSEntity 196 in the directory that matches the fileFilter 190 query.

Steps 5 and 6 are repeated for all file system entities in the directory.

Add New Property

Figure 14:
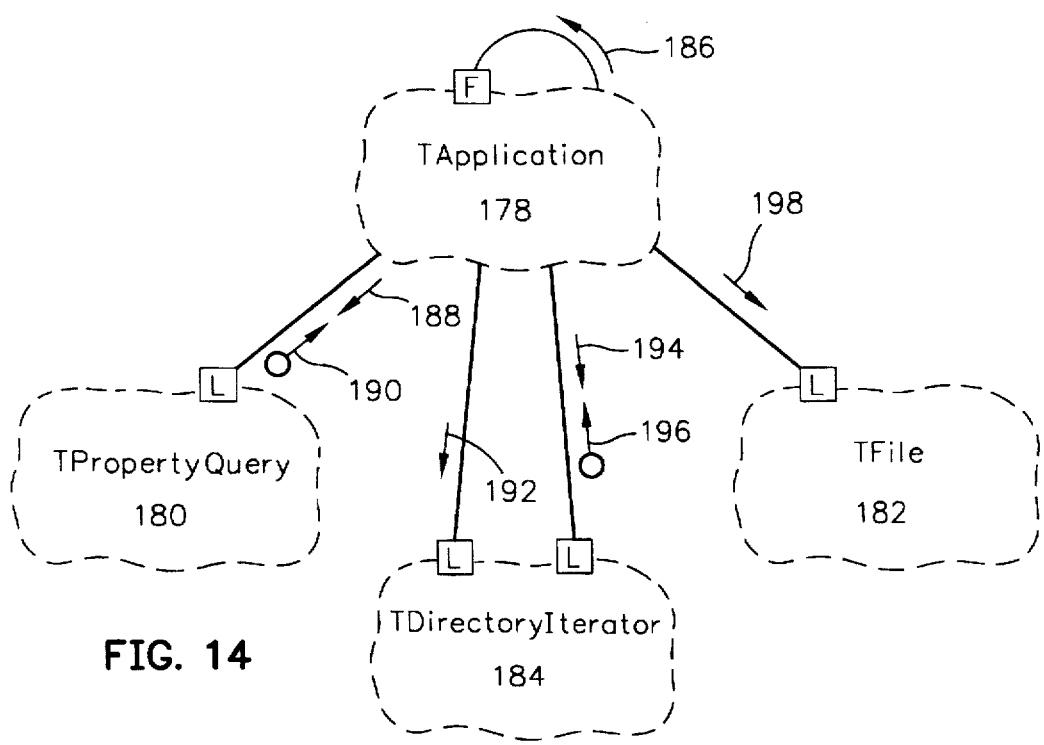
FIG. 14 shows an alternative for deleting files from a directory using a query file filter in accordance with a preferred embodiment of the invention.

In this example as shown in FIG. 14, a new property is added to all the files in a specified directory with a .cp extension in the file name. The sequence of events is as follows:

1:AddNewProperty(directory, newProperty) 208

The application 200 calls this member function specifying the directory and the newProperty to add to all the files in the directory with a .cp extension in the file name.

2:TPropertyQuery=(TFSEntityKind == TFile::kKind && TFile::kEntityName =="*.cp") 210

A local fileFilter 212 of type TPropertyQuery 202 is created and initialized with a query to search for file system entities of TFile::kKind, and for files with a TFile::kEntityName property having a .cp extension.

3:TDirectoryIterator(directory, fileFilter) 214

A local TDirectoryIterator 204 is created and initialized with the directory with the files to add the property and the fileFilter 212. The TDirectoryIterator 204 will search for and return file system entities that match the fileFilter 212 query.

4:First( ) 216 A message is sent to the TDirectoryIterator 204 to return the first TFSEntity 218 in the directory that matches the fileFilter 212 query.

5:WriteProperty(newProperty) 220

Add the newProperty to the TFSEntity 218 (always a TFile 206) returned by the TDirectoryIterator 204.

6:Next( ) 216

A message is sent to the TDirectoryIterator 204 to return the next TFSEntity 218 in the directory that matches the fileFilter 212 query.

Steps 5 and 6 are repeated for all file system entities in the directory.

Update Records

Figure 15:
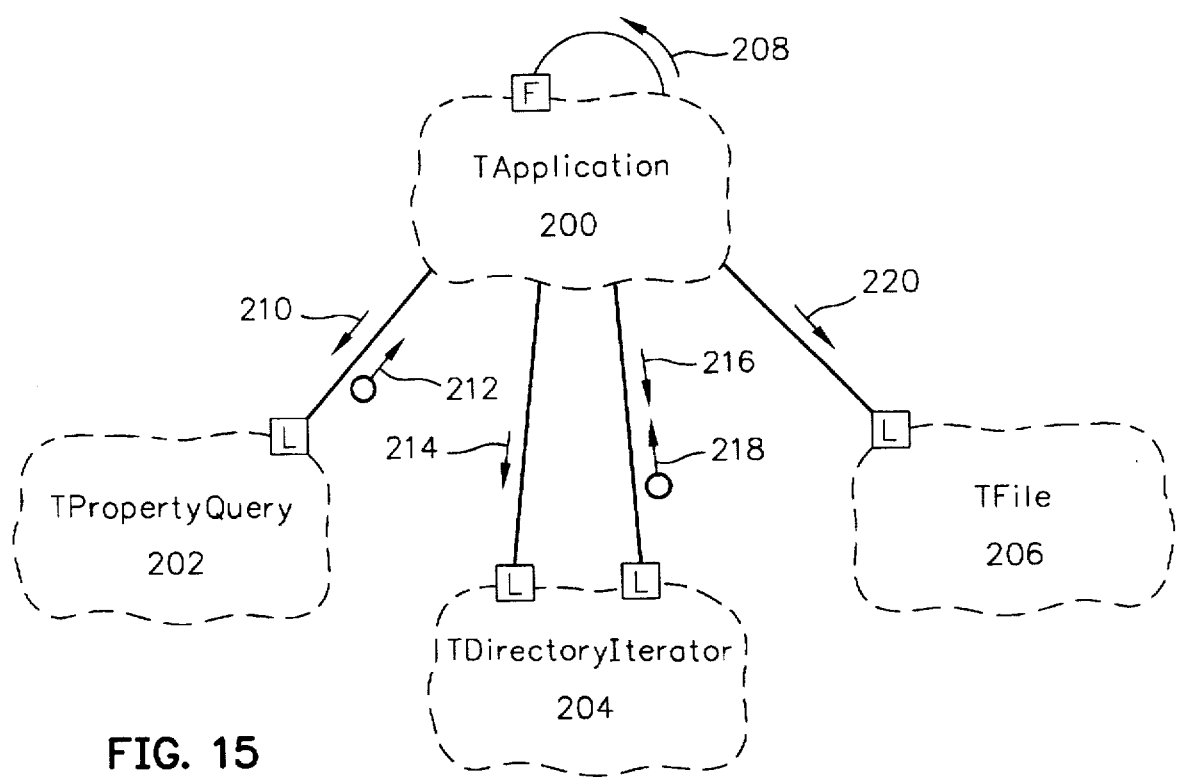
FIG. 15 shows how to add a new property to all the files in a specific directory in accordance with a preferred embodiment of the invention.

In this example as shown in FIG. 15, a specified record from a given file is read, updated and then written back to the file. A TFileRangeLock 176 is used to prevent write access by other users during the update. The sequence of events is as follows:

1:UpdateRecords(aFile, recNumber) 228

The application 222 calls this member function specifying aFile and recNumber to update.

2:TFileStream(aFile, kReadWriteShared) 230

A local stream 232 derived from TFileStream 224 is created and initialized with the file. The file is opened with kReadWriteShared permissions.

3:TFileRangeLock(stream, startByte, recordSize, kWrite) 242

A TFileRangeLock 226 is created and initialized with the file stream 232, startByte, recordSize, and a kWrite lock on the range of bytes (startByte to recordSize). The TFileRangeLock 226 prevents other users from writing to the file accessed by the stream 232.

4:record <<= stream 236

A message is sent to the stream 236 to seek to the startByte position specified in step 3. A record 236 is read from the stream 232 using an <<= operator provided by the record class for reading from a stream, and the record is then updated.

5:record =>> stream 238

A message is sent to the stream 236 to seek to the startByte position specified in step 3. The record 236 is then written to the stream 232 using an <<= operator provided by the record class for writing to a stream.

6:~TFileStream( ) 240

After the update and write is completed, the TFileRangeLock 226 is destroyed when the stream 232 is destroyed releasing the TFileRangeLock 226 on the bytes updated.

Figure 16:
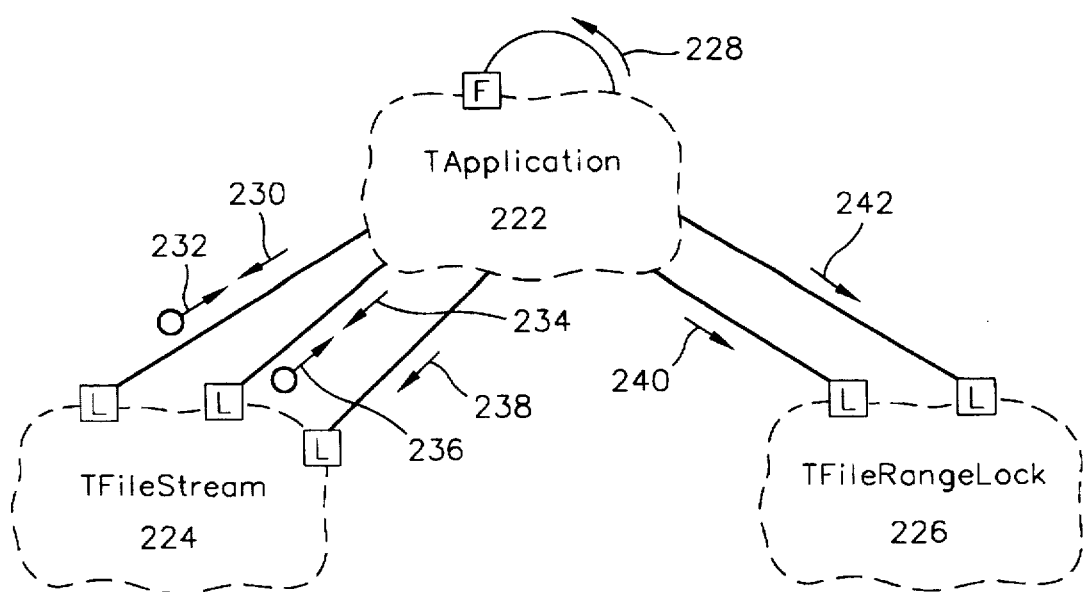
FIG. 16 shows how to use range locking and file streams for updating the records of a file in accordance with a preferred embodiment of the invention.

Add Principle To Volumes In this example as shown in FIG. 16, a new principle is added to all the volumes and assigned the specified access permissions. The sequence of steps is as follows:

1:AddPrincipleToAllVolumes(credentials, principle, permissions) 252

The application 244 calls this member function specifying the current user's credentials, principle to add, and the permissions associated with the principle.

2:TVolumesIterator(credentials) 254

A TVolumesIterator 146 is created and initialized with the credentials of the current user. The credentials are used to access the volumes iterated through.

3:First( ) 258

A message is sent to the TVolumesIterator 246 to return the first volume 256.

4:GetACL( ) 262

The volumeACL 264 of type TDirectoryAccessControlList (ACL) 250 is retrieved from the volume 256.

5:SetPermissions(principle, permissions) 268

A message is sent to the volumeACL 264 to add the new principle with the specified access permissions to the volumeACL 264.

6:SetACL(volumeACL) 260 The SetPermission 268 of step 5 only updates the volumeACL 264 which is a surrogate object and not the actual ACL for the volume 256. Therefore, a SetACL 260 message is sent to the volume 256 specifying the volumeACL 264 to update the actual ACL for the volume 256.

7:Next( ) 258

A message is sent to the TVolumesIterator 246 to return the next volume 256.

Steps 4 through 7 are repeated for all the volumes accessible by the user as determined by the credentials.

Add Principle To a File

Figure 17:
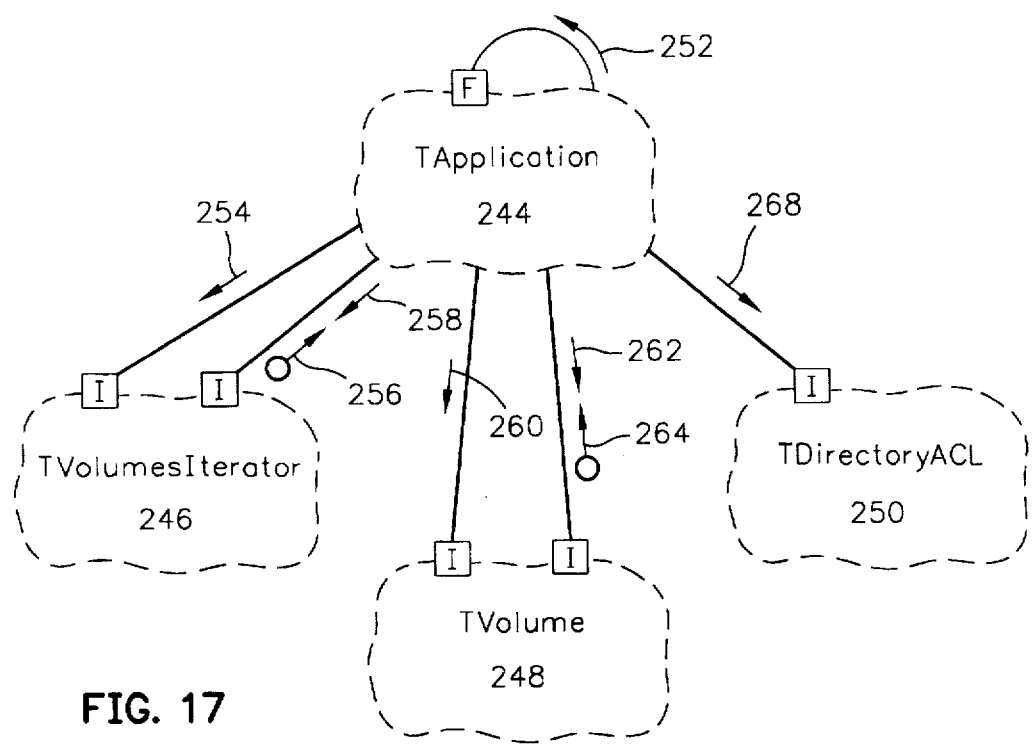
FIG. 17 shows how to add a new principle to the access control list of all mounted volumes in accordance with a preferred embodiment of the invention
Figure 18:
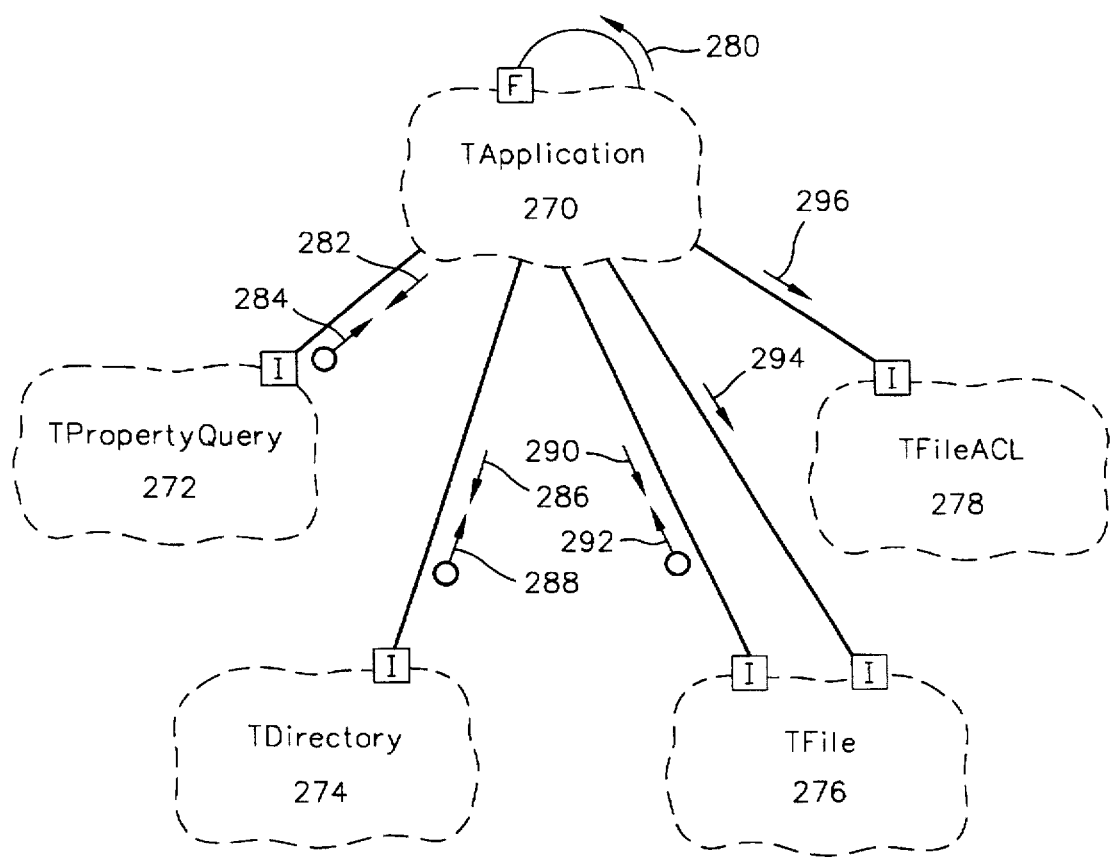

In this example as shown in FIG. 17, a new principle is added to a specified file in a specified directory and assigned the specified access permissions. The sequence of steps is as follows:

1:AddPrincipleToFile(directory, fileName, principle, permissions) 280 The application 270 calls this member function specifying the directory and fileName, the principle to add, and the permissions associated with the principle. The credentials and associated principle used to modify the file's TFileACL 278 is the TCredentials of the directory.

2:TPropertyQuery=(TFSEntityKind == TFile::kKind &&

TFile::kEntityName == fileName) 210

A local fileFilter 284 of type TPropertyQuery 272 is created and initialized with a query to search for file system entities of TFile::kKind, and for files with a TFile::kEntityName property equal to fileName.

3:LookUp(TPropertyQuery) 286

A message is sent to the directory (of type TDirectory 274) to LookUp and return the file 288 that matches the query 284.

4:GetACL( ) 290

A message is sent to the file 288 (of type TFile 276) to return its fileACL (Access Control List) 292.

5:SetPermissions(principle, permissions) 296

A message is sent to the fileACL 292 (of type TFileACL 278) to add the new principle and assign the specified permissions to the principle.

6:SetACL(fileACL) 294

The SetPermission 268 of step 5 only updates the fileACL 292 which is a surrogate object and not the actual ACL for the file 288. Therefore, a SetACL 294 message is sent to the file 288 specifying the fileACL 292 to update the actual ACL for the file 288.

File System Interface

```
25  // Copyright (C) 1994 Taligent, Inc. All rights reserved.
    //*********************************************************************************
    //**********
    //  NAME
    //      FileSystemInterface.h
30  //
    //  CREATED BY
    //      File System Team
    //
    //  DESCRIPTION
35  //      This file declares the following File System Interface classes:
    //
    //              * TFileSystemEntity  -      Base class supporting MPropertyStore protocol.
```

-51-

```
//      * TDirectory           -    Surrogate for a directory.
//      * TVolume              -    Surrogate for a volume.
//      * TFile                -    Surrogate for a file.
//
//      * TDirectoryIterator   -    An iterator over a directory.
//      * TDirectoryTreeIterator  -A "depth-first" iterator over a directory subtree.
//      * TVolumesIterator     -    An iterator over mounted volumes.
//
//      * MOpenFile            -    Base class for files open for data access.
//      * TFileStream          -    A file open for streaming data access.
//      * TMappedFile          -    A file open for direct memory data access.
//
//      * TFileSystemCopier    -Provides support for copying files and directories.
//      * TFileSystemMover          Provides support for moving files and directories.
//
//      * TPathName            -    Class representing a full or partial path to a
//                                  file system entity.
//      * TPathNameParser      -Protocol for converting between host-specific paths
//                                  and TPathName objects.
//      * TUnixPathNameParser: Implementation that knows how to convert from Unix-
//                                  style paths to TPathNames and back.
//
//      and the following related type(def)s:
//
//      * TFileSystemEntityName    -    Name for a file system entity (TText).
//      * TFileSystemEntityKind    -    Type of file system entity (TToken).
//      * FileSystemEntitySize     -    Unsigned size (TUnsignedDoubleLong).
//      * FileSystemEntitySizeDelta -   Signed size (TDoubleLong).
//      * THostSpecificPathName    -Type for unparsed path names (TStandardText).
//
```

-52-

```
//*********************************************************************
**
#ifndef _FILESYSTEMINTERFACE_
#define _FILESYSTEMINTERFACE_
5   //_____

// Includes
    //_____
        #ifndef         Taligent_TOKENS
10          #include    <Tokens.h>
        #endif
        #ifndef         Taligent_COLLECTIONS
            #include    <Collections.h>
        #endif
15      #ifndef         Taligent_CLOCK
            #include    <Clock.h>
        #endif
        #ifndef         Taligent_TEXTCLASSES
            #include    <TextClasses.h>
20      #endif
        #ifndef         _PROPERTY_
            #include    <Property.h>
        #endif
        #ifndef         Taligent_CLOCK
25          #include    <Clock.h>
        #endif
        #ifndef         Taligent_MEMORY
            #include    <Memory.h>
        #endif
30  //_____
        //      TypeDefs
    //_____
        typedef TToken              TFileSystemEntityKind;
        typedef TStandardText       TFileSystemEntityName;
35      typedef TDoubleLong         TUnsignedDoubleLong;
        typedef TDoubleLong         FileSystemEntitySizeDelta;
        typedef TUnsignedDoubleLong FileSystemEntitySize;
        typedef TStandardText       THostSpecificPathName;
```

```
        typedef TArrayOf<TStandardText>        TPathComponentArray;
        //_____
        __ // Forward declarations
        //_____
 5      __ class TFileRange;
        class TFileSystemEntity;
        class TDirectory;
        class TVolume;
        class TFile;
10      class TDirectoryIterator;
        class TDirectoryTreeIterator;
        class TVolumesIterator;
        class TMappedFile;
        class TFileStream;
15      class TFSEntityMaster;
        class TFSDirectoryMaster;
        class TFSFileMaster;
        class TFSVolumeMaster;
        class TFSDirectoryIterator;
20      class TFSClientRecordAccessor;

class TPathName;
        class TPathNameParser;
        class TUnixPathNameParser;
25      // NewPage
        /*
        ***********************************************************
        ***
        *
30      *   CLASS
        *       TFileRange
        *
        *   DESCRIPTION
        *       This class provides a simple file range notion.
35      *
        ***********************************************************
        */
        class TFileRange {
```

-54-

```
        public:
                        TFileRange      (const TFileRange& copyMe);
                        TFileRange      (FileSystemEntitySize offset,
        FileSystemEntitySize length); TFileRange    ();
                        ~TFileRange    ();
            FileSystemEntitySize        GetOffset       () const;
            FileSystemEntitySize        GetLength       () const;
        void                    SetOffset       (FileSystemEntitySize offset); void
        SetLength       (FileSystemEntitySize length); TFileRange&             operator =
        (const TFileRange& copy); Boolean                 operator ==     (const TFileRange&
        compareMe);
        //_____
        ___ // Streaming Functions
        // Cannot be virtual, called at constructor time.
        //_____
        ___ TStream&                    operator >>=    (TStream& toWhere) const; TStream&
        operator <<=    (TStream& fromWhere);
            static const TFileRange&    kEntireFile;
        private:
            FileSystemEntitySize        fOffset;
            FileSystemEntitySize        fLength;
            static const TFileRange     fgEntireFile;
        };
        // NewPage
        /*
        ************************************************************************
        *   CLASS
        *       TFileSystemEntity
        *
        *   DESCRIPTION
        *       This class implements MPropertyStore protocol for all file system entities. All file
        *       system entities (i.e. file, directory and volume) are derived from TFileSystemEntity.
        *
        *   NOTES
        *
        ************************************************************************
        */
        class TFileSystemEntity : public MCollectible, public MPropertyStore  {
```

-55-

```
       public:
       //_____
       __ // System Defined Property Identifiers
       //_____
 5     __    static const TExtendedPropertyID<TFileSystemEntityName>&         kName;
             static const TExtendedPropertyID<TFileSystemEntityKind>&
             kFileSystemEntityKind;
             static const TExtendedPropertyID<TTime>&                         kCreationTime;
             static const TExtendedPropertyID<TTime>&                         kModificationTime;
10           static const TPrimitivePropertyID<FileSystemEntitySize>&
             kPhysicalSizeAllocated;
             static const TPrimitivePropertyID<FileSystemEntitySize>&  kFreeSpace;
             static const TPrimitivePropertyID<FileSystemEntitySize>&  kTotalSpace;
       //_____
15     __ // "Special" Functions
       //_____
       --
                                  TFileSystemEntity   ();
                   TFileSystemEntity   (const TFileSystemEntity& copy); TFileSystemEntity&
20         operator =              (const TFileSystemEntity& right);
           virtual         ~TFileSystemEntity          ();
       //_____
       --
       // Determine what properties are present
25     //_____
       --
           virtual void        ReadAllPropertyIDs       (TPropertyIDSet& fillin)
       const;
       //_____
30     __ // Read or write multiple properties
       //_____
       __    virtual void        ReadAllProperties        (TPropertySet& fillin) const;
             virtual Boolean         ReadProperties       (TPropertySet& fillin) const;
             virtual void        WriteProperties          (const TPropertySet&
35     properties);
       //_____
       __ // Read or write individual properties
       //_____
```

-56-

```
          virtual Boolean        ReadProperty           (TProperty& fillin)
       const;
          virtual void           WriteProperty          (const TProperty&
       property);
 5     //_____
       __ // Other operations
       //_____
          virtual Boolean        DeleteProperty         (const
       TPropertyID& id);
10        virtual Boolean        DeleteProperties       (const
       TPropertyIDSet& set);
          virtual Boolean        Member                 (const TPropertyID&
       id) const;
          virtual Boolean        SatisfiesQuery         (const
15     TPropertyQuery& query) const;
          virtual unsigned long  GetPropertiesCount     () const;
          virtual unsigned long  GetPropertiesSize      () const;
       //_____
       __ // Access system defined properties
20     //_____
          virtual TFileSystemEntityName GetName         () const;
          virtual void           SetName                (const
       TFileSystemEntityName& newName) const;
          virtual TTime          GetCreationTime        () const;
25        virtual void           SetCreationTime        (const TTime& creationTime) const;
          virtual TTime          GetModificationTime    () const;
          virtual void           SetModificationTime    (const TTime& modificationTime)
       const;
          private: virtual       FileSystemEntitySize GetPhysicalSizeAllocated () const;
30     public: //
       //_____
       __ // Type safety functions
       //_____
          virtual TFileSystemEntityKind  GetFileSystemEntityKind () const;
35        virtual Boolean        IsA                    (const TFileSystemEntityKind&
       kind) const;
       //_____
       __ // Navigation
```

-57-

```
//_____
__     virtual Boolean        IsTemporary       () const;
       virtual TVolume        GetVolume         () const;
       virtual Boolean        HasParent         (TDirectory& fillinParent)
  const;
//_____
--
//     Deletion
//_____
__     virtual void           DeleteSelf        (Boolean deleteChildren = kFalse);
//_____
__ // MCollectible Functions
//_____
__     MCollectibleDeclarationsMacro  (TFileSystemEntity);
       virtual long           Hash              () const;
       virtual Boolean        IsEqual           (const MCollectible* obj)
  const;
       virtual TStream&       operator >>=      (TStream& toWhere) const;
       virtual TStream&       operator <<=      (TStream& fromwhere);
// Subclass Interface
//_____
__ protected:
                              TFileSystemEntity (TFSEntityMaster* master);
              Boolean         TypeSafeAssign    (const TFileSystemEntity& right,
                                                 const TFileSystemEntityKind& kind);
       TFSEntityMaster*   GetMaster             () const;
              void            SetInvalid        ();
#ifndef NO_Internal    // === Internal Interface ===
//_____
__ // Internal Utility Functions
//_____
__ private:
              void            AssertValid       () const;
              void            InvalidMaster     () const;

//_____
__ // Data Members
```

```
//_____
--
private:
        TFSEntityMaster*        fMaster;
        static const TExtendedPropertyID<TFileSystemEntityName>         fgName;
        static const TExtendedPropertyID<TFileSystemEntityKind>
        fgFileSystemEntityKind;
        static const TExtendedPropertyID<TTime>                         fgCreationTime;
        static const TExtendedPropertyID<TTime>                         fgModificationTime;
        static const TPrimitivePropertyID<FileSystemEntitySize>
        fgPhysicalSizeAllocated;
        static const TPrimitivePropertyID<Boolean>                      fgPackaged;
        static const TPrimitivePropertyID<FileSystemEntitySize>         fgFreeSpace;
        static const TPrimitivePropertyID<FileSystemEntitySize>         fgTotalSpace;
        friend class TFSClient;     // So can use protected constructor (TFSEntityMaster*)
                                    // and GetMaster().
        friend class TFSClientSet;  // So can use protected GetMaster()
        friend class TFSEntityMaster;  // So can use protected GetMaster()
    #endif // NO_Internal
};
// NewPage
/*
 ************************************************************************
 *
 *      CLASS
 *              TDirectory
 *
 *      DESCRIPTION
 *              This class provides a surrogate object for a file system directory.
 *
 *      NOTES
 *
 ************************************************************************
 */
class TDirectory : public TFileSystemEntity {
public:
//_____
__ // Class Constants
```

-59-

```
//_____ static const    TFileSystemEntityKind&              kKind;
        static          TPropertySet&           kNoProperties;
//_____
    // System Defined Property Identifiers
//_____
        static const TPrimitivePropertyID<FileSystemEntitySize>&    kMemberCount;
//_____
    // "Special" Functions
//_____
                        TDirectory      ();
                        TDirectory      (const TDirectory& copy);
                        TDirectory&     operator =          (const
                        TDirectory& right);
        virtual         ~TDirectory     ();

//_____
    // Downcast "Special" Functions
    // These functions will throw a TFileSystemTypeMismatch exception if types are different.
//_____
                        TDirectory      (const TFileSystemEntity& copy);
                TDirectory&     operator =      (const TFileSystemEntity& right);
//_____
    // Access system defined properties
//_____
        private: virtual    FileSystemEntitySize    GetMemberCount      () const;
public:
//_____

// Browsing
//_____
        virtual TFileSystemEntity       LookUp      (const TPropertyQuery& query) const;
        virtual TFileSystemEntity       LookUp      (const TPropertyQuery& query,
                                        TPropertySet& fillin) const; virtual
                TFileSystemEntity       TreeLookUp  (const TPropertyQuery& query) const;
```

-60-

```
        virtual TFileSystemEntity    TreeLookUp    (const TPropertyQuery&
    query,
                            TPropertySet& fillin) const;
    //_____
    --
    // Creation/Deletion
    //_____
        -- virtual TDirectory    CreateDirectory    (const
    TFileSystemEntityName& directoryName,
    const TPropertySet& initialProperties = kNoProperties, FileSystemEntitySize
    initialMemberCount = 0);
        virtual TFile    CreateFile    (const TFileSystemEntityName&
    fileName,
    const TPropertySet& initialProperties = kNoProperties, FileSystemEntitySize
    initialFileSize = 0);
        virtual void    DeleteAllContents ();
    //_____
    -- // MCollectible Functions
    //_____
        -- MCollectibleDeclarationsMacro    (TDirectory);
    //_____
    -- // Subclass Interface
    //_____
    -- protected:
                TDirectory    (TFSDirectoryMaster* master);
    #ifndef NO_Internal   // === Internal Interface ===
    //_____
    -- // Data Members
    //_____
    --
    private:
            static const TFileSystemEntityKind    fgKind;
            static TPropertySet    fgNoProperties;
            static const TPrimitivePropertyID<FileSystemEntitySize>    fgMemberCount;
            friend class TDirectoryIterator;
            friend class TDirectoryTreeIterator;

#endif // NO_Internal
```

```
};
// NewPage
/*
**********************************************************************
*** *
*       CLASS
*           TVolume
*
*       DESCRIPTION
*           This class provides a surrogate object for a file system volume.
*
*       NOTES
*
**********************************************************************
**/
class TVolume : public TDirectory {
public:
//_____

//      Entity Kind
//_____ static const TFileSystemEntityKind&             kKind;
//_____
    // System Defined Property Identifiers
//_____
        static const TPrimitivePropertyID<FileSystemEntitySize>&    kTotalSpace;
        static const TPrimitivePropertyID<FileSystemEntitySize>&    kFreeSpace;
        static const TPrimitivePropertyID<Boolean>&                 kReadOnly;
//_____

//      "Special" Functions
//_____
                    TVolume         ();
        TVolume     (const TVolume& copy); TVolume&       operator =      (const TVolume& right);
        virtual                     ~TVolume         ();
```

```
//_____
__ // Downcast "Special" Functions
// These functions will throw a TFileSystemTypeMismatch exception if types are different.
//_____
    __   TVolume      (const TFileSystemEntity& copy); TVolume&        operator =
         (const TFileSystemEntity& right);
         //_____
    --
    // Access system defined properties
    //_____
    --
         virtual FileSystemEntitySize   GetFreeSpace           () const;
         virtual FileSystemEntitySize   GetTotalSpace          () const;
    //_____
    __ // Temp file/dir stuff
    //_____
    --   virtual TFile MakeUniqueTemporaryFile   (const TPropertySet& initialProperties =
         kNoProperties,
                              FileSystemEntitySize initialFileSize = 0);
    virtual TFile           MakeTemporaryFile       (const TFileSystemEntityName&
    fileName, const TPropertySet& initialProperties = kNoProperties,
    FileSystemEntitySize initialFileSize = 0);
    virtual TDirectory      MakeUniqueTemporaryDirectory(const TPropertySet&
    initialProperties = kNoProperties, FileSystemEntitySize initialMemberCount = 0);
    virtual TDirectory      MakeTemporaryDirectory  (const TFileSystemEntityName&
                                    directoryName,
    const TPropertySet& initialProperties = kNoProperties, FileSystemEntitySize
    initialMemberCount = 0);
    #ifndef NO_SPI // === Systems Programmer Interface ===
         static const TPrimitivePropertyID<Boolean>&                          kLocal;
         static const TPrimitivePropertyID<Boolean>&                          kFixed;
         private: virtual Boolean       IsLocal         () const; public:
         private: virtual Boolean       IsFixed         () const; public:
    //_____
    // Volume operations
    //_____
    private: virtual void       UnMount             (Boolean eject = kTrue); public:
    //    private: virtual void       BringOnline         () const; public:
```

-63-

```
        private: virtual void          TakeOffline         () const; public:   //
        _NOT_IMPLEMENTED_ private: virtual Boolean                 IsOnline         () const; public:
        #endif // NO_SPI
        //_____
   5    // Property Acceleration
        //_____
        //_____
        // MCollectible Functions
        //_____
  10           MCollectibleDeclarationsMacro    (TVolume);
        //_____
        // Subclass Interface
        //_____
        protected:
  15                    TVolume         (TFSVolumeMaster* master);
        #ifndef NO_Internal   // === Internal Interface ===
        //_____
        // Data Members
        //_____
  20    private:
                static const TFileSystemEntityKind                      fgKind;
                static const TPrimitivePropertyID<FileSystemEntitySize> fgTotalSpace;
                static const TPrimitivePropertyID<FileSystemEntitySize> fgFreeSpace;
                static const TPrimitivePropertyID<Boolean>      fgLocal;
  25            static const TPrimitivePropertyID<Boolean>      fgFixed;
                static const TPrimitivePropertyID<Boolean>      fgReadOnly;
                   friend class  TFSVolumeMaster;    // So can use protected constructor.
                   friend class  TVolumesIterator;
        #endif // NO_Internal
  30    };
        // NewPage
        /* *****************************************  *
        *       CLASS
        *          TFile
  35    *
        *       DESCRIPTION
        *          This class provides a surrogate object for a file.
        *
```

```
/*      NOTES
 ********************************** */
class TFile : public TFileSystemEntity {
public:
 5   //_____
     //    Entity Kind
     //_____      static const
     TFileSystemEntityKind&           kKind;
     //_____
10   //    System Defined Property Identifiers
     //_____      static const
     TPrimitivePropertyID<FileSystemEntitySize>&    kEndOfFile; static const
     TPrimitivePropertyID<Boolean>&                 kOpenFile;
     //_____
15   //    "Special" Functions
     //_____
     TFile      ();
     TFile      (const TFile& copy);
     TFile&                 operator =    (const TFile& right); virtual
20   ~TFile     ();
     //_____
     //    Downcast "Special" Functions
     //    These functions will throw a TFileSystemTypeMismatch exception if types are different.
     //_____
25   TFile      (const TFileSystemEntity& copy);
     TFile&                 operator =    (const TFileSystemEntity& right);
     //_____
     // Access system defined properties
     //_____
30          virtual FileSystemEntitySize      GetEndOfFile      () const;
     //_____
     // MCollectible Functions
     //_____
            MCollectibleDeclarationsMacro    (TFile);
35   //_____
     // Subclass Interface
     //_____
     protected:
```

-65-

```
                TFile   (TFSFileMaster* master);
     #ifndef NO_SPI  // === Systems Programmer Interface ===
     //_____
     // MOpenFile Support Functions
 5   //_____
     protected:
                virtual void         Open         (TFSClientRecordAccessor& accessor,
                        Boolean deleteOnClose) const; private: virtual void    CopyOpenFile
                    (const TFSClientRecordAccessor& source,
10                       TFSClientRecordAccessor& copy) const; protected:
     #endif // NO_SPI
     #ifndef NO_Internal   // === Internal Interface ===
     //_____
     // Data Members
15   //_____
     private:
                static const TFileSystemEntityKind  fgKind;
                static const TPrimitivePropertyID<FileSystemEntitySize>       fgEndOfFile;
                static const TPrimitivePropertyID<Boolean>        fgOpenFile;
20              friend class  MOpenFile;
                friend class  TDirectoryIterator;
                friend class  TDirectoryTreeIterator;
     #endif // NO_Internal
     };
25   // NewPage
     /*  ********************************************************
      *     CLASS
      *        TDirectoryIterator
      *
30    *     DESCRIPTION
      *        An iterator over a file system directory.
      *
      *     NOTES
      *  ******************************************************** */
35   class TDirectoryIterator {
     public:
     //_____
     //      Constants
```

```
          //_____
              static const TPropertyIDSet&        kNoProperties;
                  static const TPropertyQuery&        kNoQuery;
                  static const TFileSystemEntity&     kEndOfIteration;
5         //_____
              //      "Special" Functions
              //_____
                  TDirectoryIterator ();
              TDirectoryIterator (const TDirectory& directory,
10        const TPropertyIDSet& properties = kNoProperties, const TPropertyQuery& aQuery =
          kNoQuery);
                  TDirectoryIterator (const TDirectoryIterator& copy); TDirectoryIterator&
                  operator =         (const TDirectoryIterator& right);
                  virtual            ~TDirectoryIterator ();
15        //_____
              //      Data Access Functions
              //      All functions return kEndOfIteration when there are no more entities to return:
              //
              //      for     (TFileSystemEntity    anEntity = directoryIterator.First();
20        //                               anEntity != TDirectoryIterator::kEndOfIteration;
              //                               anEntity = directoryIterator.Next())
              //      {
              //          // Do something.
              //      }
25        //
              //_____
              // These variants are useful when you pass an empty TPropertyIDSet (like kNoProperties)
              // to the constructor:
                  virtual TFileSystemEntity      First     ();
30            virtual TFileSystemEntity      Next      ();
                  // These variants are useful when you pass a non-empty TPropertyIDSet to the
          constructor.
                  // The TPropertySet will be emptied and filled with the properties specified by the
                  // constructor argument.
35            // If you pass an empty TPropertyIDSet to the constructor (like kNoProperties), the
                  // TPropertySet will be emptied.
                  virtual TFileSystemEntity      First     (TPropertySet& fillinProperties);
                  virtual TFileSystemEntity      Next      (TPropertySet& fillinProperties);
```

-67-

```
       protected:
           TDirectoryIterator (const TDirectory& directory, const TPropertyIDSet& properties, const
           TPropertyQuery& aQuery,
           Boolean beRecursive);
 5     #ifndef NO_Internal    // === Internal Interface ===
       //_____
       //     Data Members
       //_____ private:
           TFSDirectoryIterator*              fIterator;
10     #endif // NO_Internal
       };
       // NewPage
       /* *********************************************************************
        *     CLASS
15      *         TDirectoryTreeIterator
        *
        *     DESCRIPTION
        *         A "depth-first" iterator over a file system directory subtree.
        *
20      *     NOTES
       ********************************************************* c
       lass TDirectoryTreeIterator : public TDirectoryIterator {
       public:
       //_____
25     //     Constants
       //_____
       static const TPropertyIDSet&         kNoProperties;
           static const TPropertyQuery&     kNoQuery;
           static const TFileSystemEntity&  kEndOfIteration;
30     //_____
       //     "Special" Functions
       //_____
           TDirectoryTreeIterator ();
                   TDirectoryTreeIterator (const TDirectory& directory,
35     const TPropertyIDSet& properties = kNoProperties, const TPropertyQuery& aQuery =
       kNoQuery);
                   TDirectoryTreeIterator (const TDirectoryTreeIterator& copy);
           TDirectoryTreeIterator& operator =       (const TDirectoryTreeIterator& right);
```

```
                virtual                    ~TDirectoryTreeIterator ();
        };
        // NewPage
        /*********************************************************
 5      CLASS
         *          TVolumesIterator
         *
         *      DESCRIPTION
         *          An iterator over mounted volumes.
10       *
         *      NOTES
         * **************************************** */
        class TVolumesIterator {
        public:
15      //_____
        //      Entity Kind
        //_____            static const
        TPropertyIDSet&   kNoProperties;
                static const TPropertyQuery&   kNoQuery;
20              static const TVolume&          kEndOfIteration;
        //_____
        //      "Special" Functions
        //_____
        TVolumesIterator (const TPropertyIDSet& properties = kNoProperties,
25              const TPropertyQuery& aQuery = kNoQuery);
                TVolumesIterator (const TVolumesIterator& copy);
                TVolumesIterator&    operator =    (const TVolumesIterator& right);
                virtual              ~TVolumesIterator ();
        //_____
30      //      Data Access Functions
        //      All functions return kEndOfIteration when there are no more volumes to return:
        //
        //      for   (TVolume    aVolume = volumeIterator.First();
        //                        aVolume != TVolumesIterator::kEndOfIteration;
35      //                        aVolume = volumeIterator.Next())
        //        {
        //
        //        }
```

```
        //  //_____
        // These variants are useful when you pass an empty TPropertyIDSet (like kNoProperties) //
        to the constructor:
            virtual TVolume          First      ();
  5         virtual TVolume          Next       ();
            // These variants are useful when you pass a non-empty TPropertyIDSet to the
        constructor.
            // The TPropertySet will be emptied and filled with the properties specified by the
            // constructor argument.
 10         // If you pass an empty TPropertyIDSet to the constructor (like kNoProperties), the
            // TPropertySet will be emptied.
            virtual TVolume          First      (TPropertySet& fillinProperties);
            virtual TVolume          Next       (TPropertySet& fillinProperties);
        #ifndef NO_Internal   // === Internal Interface ===
 15         static const TFSClientSet&       kFSClientSet;
        //_____
        //    Data Members
        //_____
        private:
 20         TPropertyIDSet                   fProperties;
            TPropertyQuery                   fQuery;
            TPropertyIDSet*                  fPropertiesPtr;
            TPropertyQuery*                  fQueryPtr;
            TDeque                           fVolumes;
 25         TDequeIterator*                  fIterator;
            static const TVolume             fgEndOfIteration;
            static  TFSClientSet             fgFSClientSet;
        #endif // NO_Internal
        };
 30     // NewPage
        /*
        ********************************************************
        *
        *         CLASS
 35     *              MOpenFile
        *
        *         DESCRIPTION
        *              This class provides a surrogate object for a named file
```

```
                    *       that is open for data access.
                    *       This class is used solely as a mix-in class for
                    *       TMappedFile and TFileStream. Note
                    *       that the permissions shown in this class apply to data
  5                 *       only; they are not applied to properties.
                    */
            class MOpenFile {
            public:
            //_____
 10         // Data Sharing Permissions
            //_____
                    enum EPermissionsForMe
                    {
                            kRead,
 15                         kReadWrite,
                            kEPermissionsForMeMaxValue   = 255
                    };
                    enum EPermissionsForOthers
                    {
 20                         kAllowNone,
                            kAllowRead,
                            kAllowReadWrite,
                            kEPermissionsForOthersMaxValue = 255
                    };
 25         //_____
            ___ // Special Functions
            //_____
            ___     MOpenFile   (const MOpenFile& copy); MOpenFile&        operator =
            (const MOpenFile& copy);
 30         ~MOpenFile  ();
            //_____
            ___ // Data Access Functions
            //_____
            ___     virtual void            SetPermissions   (EPermissionsForMe forMe,
 35                                         EPermissionsForOthers forOthers);
                    virtual void            GetPermissions   (EPermissionsForMe& fillinMine,
                                                              EPermissionsForOthers& fillinOthers) const;
                    virtual TFile           GetFile () const;
```

```
//_____
__ // File Sizing Functions
//_____
        virtual void              SetEndOfFile           (FileSystemEntitySize newSize);
        virtual FileSystemEntitySize  GetEndOfFile () const;
        private: virtual void     SetEndOfFileRelative   (FileSystemEntitySizeDelta
delta); public: // _NOT_IMPLEMENTED_
//_____
__ // Streaming Functions
// Cannot be virtual, called at constructor time.
//_____
        __        TStream&              operator >>=    (TStream& toWhere) const;
                  TStream&              operator <<=    (TStream& fromWhere);
//_____
__
//_____
__ protected:
                  MOpenFile      (const TFile& file,
        EPermissionsForMe forMe,
EPermissionsForOthers forOthers, Boolean deleteOnClose = kFalse);
        TFSClientRecordAccessor*      GetFSClientRecordAccessor() const ;
//_____
__ // These functions are provided for subclasses. If a subclass uses the default constructor
//    it MUST call InitializeOpenFile before exiting its constructor.
//_____
__ protected:
                  MOpenFile     ();
void              InitializeOpenFile (const TFile& file, EPermissionsForMe forMe,
EPermissionsForOthers forOthers, Boolean deleteOnClose = kFalse);
#ifndef NO_Internal
//_____
__ private:
            void       Initialize     ();
//_____
// Data Members
//_____
private:
        TFile            fFile;
```

-72-

```
          // Only the following fields are streamed:
          TFSClientRecordAccessor*        fAccessor ;
      #endif
          // NO_Internal
 5    };
      /*
      ****************************************************
      *
      *       CLASS
10    *           TPathNameParser
      *
      *       DESCRIPTION
      *           An abstract class for converting between
      *               TPathName(s) and THostSpecificPathName(s).
15    *
      *       NOTES
      *
      ****************************************
      */
20    class TPathNameParser {
      public:
              virtual                 ~TPathNameParser    ();
              virtual void            HostSpecificToPathName  (const THostSpecificPathName&   path,
25                                    TPathName&   anArray) const = 0; virtual void
              PathNameToHostSpecific  (const TPathName&    anArray,
                                          THostSpecificPathName&  path) const = 0;
              static const TPathNameParser&   GetDefaultParser    ();
              virtual TStream&        operator>>=     ( TStream&    toWhere) const;
30            virtual TStream&        operator<<=     ( TStream&    fromWhere);
      protected:
                                      TPathNameParser     ();
                                      TPathNameParser     (const TPathNameParser&
      copyMe);
35            TPathNameParser&        operator=           (const TPathNameParser&
      copyMe);
              static TPathComponentArray*  GetPathComponentArray  (const
      TPathName&   pathName);
```

```
                static void          SetPathComponentArray   ( TPathName& pathName,
                                     TPathComponentArray* newStorage);
        public:
        // "Second public" for internal clients (like TPathName)...
                virtual void         CreateComponentArrayFromHostSpecific (const
        THostSpecificPathName&  path,
                                             TPathComponentArray*& anArray) const = 0;
        };

/* ***************************************************** *
         *       CLASS
         *           TUnixPathNameParser
         *
         *       DESCRIPTION
         *           This class parses path names that are valid Unix paths.
         *           instances of this class are given an object of class
         *           THostSpecificPathName (TStandardText)
         *           and you will be get an object of class TPathName.
         *           The inverse function is also supported.
         *
         *       NOTES
         *           If you know that the path you wish to parse
         *           is a Unix-style path, then instantiate
         *           one of these objects directly. If the path is handed in, and *    is
        likely to be specific
         *           to the host on which your program is running, use
         *           TPathNameParser::GetDefaultParser().
         *
         * ***************************************************** *
         */
        class TUnixPathNameParser : public TPathNameParser {
        public:
                                     TUnixPathNameParser   ();
                virtual              ~TUnixPathNameParser  ();
                                     TUnixPathNameParser   (const TUnixPathNameParser&
        copyMe);
                virtual void         HostSpecificToPathName (const
        THostSpecificPathName&  path,
```

-74-

```
                              TPathName&      anArray) const; virtual void
        PathNameToHostSpecific    (const TPathName&      anArray,
                                  THostSpecificPathName&   path) const;
                   TUnixPathNameParser&   operator=      (const
5       TUnixPathNameParser&   copyMe);
                virtual TStream&          operator>>=       ( TStream&   toWhere) const;
                virtual TStream&          operator<<=       ( TStream&   fromWhere);
        private:
        Boolean           GetNextComponent   (const char*   path, char*   component,
10      int&     offset) const;
        char*              ComponentArrayToChar  (const TPathComponentArray&  text) const;
        TPathComponentArray*   CharToComponentArray      (const char*       path) const;
        public:        // "Second public" for internal clients (like TPathName)...
                virtual void              CreateComponentArrayFromHostSpecific (const
15      THostSpecificPathName&   path,
                                          TPathComponentArray*& anArray) const; };
        /*****************************************************************************
        ****
        *
20      *       CLASS
        *           TPathName
        *
        *       DESCRIPTION
        *           A class representing full or partial paths to file system entities.
25      *
        *       NOTES
        *           This class allows clients to specify file system entities via path names.
        Constructing
        *           a TPathName object, as in:
30      *
        *               TPathName aPathName("/home/widget/work/Foo.C");
        *
        *           Would allow the client to get a TFileSystemEntity representing the file
        Foo.C
35      *           via a call such as:
        *
        *               TFileSystemEntity anEntity = aPathName.GetEntity();
        *
```

-75-

```
 *        Note that there are two basic kinds of constructors: one that takes an
 *        absolute path, and one that takes a relative path (from a TDirectory that
 *        is passed in). In both cases, the resulting TPathName object is the equivalent
    of an absolute path.
 *
 *        You must provide a "parser" for the pathname that you pass in. One that
works for
 *        the system on which your program is running is available from
TPathNameParser::GetDefaultParser().
 *
 ***************************************************************************
 **********
 */
 class TPathName {
 public:
                          TPathName      ();
                          TPathName      (const TPathName&   copyMe);
                          TPathName      (const THostSpecificPathName&  path,
                                   const TPathNameParser&   aParser =
TPathNameParser::GetDefaultParser());
                          TPathName      (const TFileSystemEntity&  anEntity);
                          TPathName      (const TDirectory&   startHere,
                                   const THostSpecificPathName&  partialPath,
                                   const TPathNameParser&   aParser =
TPathNameParser::GetDefaultParser());
                          TPathName      (const TDirectory&   startHere,
                                   const TPathName&   partialPath); virtual
    ~TPathName     ();
    // Get the entity (if one exists) specified by this path name object. TFileSystemEntity
    GetEntity        ();
    // If two paths have common roots, as in /usr/include/sys/mode.h (in "this") and
    /usr/include/Foo.h, // this method will remove the common part, leaving (in "this"),
    sys/mode.h.
    void              FactorCommonRoot(const TPathName&   anotherPath, TPathName&
commonRoot,
    TPathName&    fromRootToLeaf);
          // Append one path to another. Useful for constructing a full path from two partial
    paths.
```

-76-

```
                    void        Append      (const TPathName&
relativePath);
        // This next method is like FactorCommonRoot, but works from the "end" of the path, not the
                                            beginning.
5       // If "this" path is /usr/include/sys/mode.h, and "relativePath" is
                                    /home/widget/sys/mode.h, this
            //    method will change this to be /usr/include
                    void        Truncate    (const TPathName&
relativePath);
10      // This method will remove the last "numberOfPathSegmentsToRemove" pieces of a
path.
        // If you have a path such as /usr/include/sys/mode.h, and you call Truncate(1), you
will get
            //    /usr/include/sys as a result.
15
                    void        Truncate    (       unsigned long
numberOfPathSegmentsToRemove);
        // Returns the number of parts to the path. The first component is defined to be the
"volume name" on
20          //    systems that support such as notion. On Unix, the name space does not begin
with volumes, so the first
            //    component is empty. A path name such as /usr/include/sys/mode.h would
have a count of 5 (including one
            //    for the empty volume name).
25                  unsigned long   GetNumberOfComponents () const;
        // Fill in a TStandardText with the nth component of the path. Again, with the path
/usr/include/sys/mode.h, //    calling :
            //          aPath.GetComponentAt(aPath.GetNumberOfComponents() -
1, aTextObject);
30          //    will get you the last component in a path name.
                    void        GetComponentAt (    unsigned long   index,
                                                TStandardText&  fillIn) const;
                    TPathName&  operator=   (const TPathName&
copyMe);
35                  TStream&    operator>>= (   TStream&    toWhere)
const;

TStream&    operator<<= (   TStream&    fromWhere);
                    long        Hash        () const;
```

-77-

```
                        Boolean     operator==    (const TPathName&
        anotherPath) const;
            // Return the directory where all of the interesting, Taligent-installation specific sub-
                                    directories are
5           //      located.
                static TDirectory       GetTaligentRoot ();
        private:
                        TFileSystemEntity   LookupEntityByPathName ();
            TPathComponentArray*    fPath;
10          static TPathComponentArray* CopyPathComponentArray (const
        TPathComponentArray& copyMe);
                        TPathComponentArray* GetPathComponentArray () const;
                        void        SetPathComponentArray ( TPathComponentArray*
        newStorage);
15                      void        Append       (const TPathComponentArray&
        relativePath);
        friend class TPathNameParser;
        };
        //_____
20      // Enum streaming global functions //_____
        TStream& operator <<= (MOpenFile::EPermissionsForMe& e, TStream& fromWhere);
        TStream& operator >>= (MOpenFile::EPermissionsForMe e, TStream& toWhere);
        TStream& operator <<= (MOpenFile::EPermissionsForOthers& e, TStream& fromWhere);
        TStream& operator >>= (MOpenFile::EPermissionsForOthers e, TStream& toWhere);
25      // NewPage
        /*
        ****************** CLASS
        *       TFileStream
        *
30      *   DESCRIPTION
        *       This class provides a way to create and access a named,
        *           persistent stream. A
        *       TFileStream object cannot be deep-frozen into a stream.
        *
35      *       Note that this class inherits from the stream classes.
        *           End-of-Stream functionality
        *       maps directly onto the end-of-file notion embodied in
        *           MOpenFile for this class. That
```

```
              is, "End-Of-File" is identical to the
                     GetLogicalEndOfStream() method of TStream.
              *
              *
 5   ************************/
     class TFileStream : public MOpenFile, public TRandomAccessStream {
     public:
     //_____
     // Special Functions
10   //_____
                     TFileStream      (const TFile& file,
                 MOpenFile::EPermissionsForMe forMe = MOpenFile::kReadWrite,
             MOpenFile::EPermissionsForOthers forOthers = MOpenFile::kAllowNone);
                     TFileStream      (const TFile& file,
15                                      FileSystemEntitySize bufferSize,
                 MOpenFile::EPermissionsForMe forMe = MOpenFile::kReadWrite,
                 MOpenFile::EPermissionsForOthers forOthers = MOpenFile::kAllowNone);
                 virtual         ~TFileStream    ();
     //_____
20   // Data Access Functions
     //_____
                 virtual void     Flush          ();
             private: virtual FileSystemEntitySize ReadRequest   (TStream& toStream,
                              FileSystemEntitySize bytesToReadFromMe); public: //
25   _NOT_IMPLEMENTED_
     //_____
     // Perfomance Hint Functions
     //_____
                 private: virtual void   AdviseSequential        (); public:       private:
30   virtual void    AdviseSequential        (const TFileRange& sequentialRange); public:
                 private: virtual void   AdviseRandom            (); public:
                 virtual StreamPosition          GetPosition             () const;
                 virtual StreamPosition          GetLogicalEndOfStream   () const;
                 virtual StreamPosition          GetPhysicalEndOfStream  () const;
35               private: virtual    Boolean GetReadOnly         () const; public:
                 virtual void        Seek        .   (StreamPosition position);
                 virtual void        SetLogicalEndOfStream (StreamPosition);
                 FileSystemEntitySize GetEndOfFile          () const;
```

-79-

```
                void         SetEndOfFile      (FileSystemEntitySize endOfFile);
        #ifndef NO_SPI  // === Systems Programmer Interface ===
        //_____
        // TStream Overrides
5       //_____
                private: virtual TStream&    operator >>=     (TStream& toWhere) const;
        public:
                private: virtual TStream&    operator <<=     (TStream& fromWhere);
        public:
10      protected:
                virtual void         HandleBufferFull     (const void* source,
        size_t sourceSize, PrimitiveType theType);
                virtual void         HandleBufferEmpty    (void* destination,
        size_t destinationSize, PrimitiveType theType);
15              virtual void         SetPhysicalEndOfStream  (StreamPosition);
        //_____
        __ // Special Functions: These functions allow a subclass to delay the initialization until
        //     the base class constructors have executed. The default constructor below leaves the
        //     object in an uninitialized state. The subclass MUST call "InitializeFileStream" during
20      //     its constructor!
        //_____
        __                           TFileStream          ();
                    void             InitializeFileStream (const TFile& file,
        //_____
25      __          private:         TFileStream          (const TFileStream& copy);
        public:
        //_____
        __          private: TFileStream&    operator =    (const TFileStream& copy);
30      //_____
        __
        //_____
        __ // Data Members
        //_____
35      __ private:
                StreamPosition       fFilePosition;
                StreamPosition       fBufferSize;
                char*                fBuffer;
```

-80-

```
                void*           fFileStream;
                int                     fFileDescriptor;
                    void        Initialize    (const TFile&              file,
            MOpenFile::EPermissionsForMe  forMe,
5       MOpenFile::EPermissionsForOthers  forOthers);
                    void        ReadData      (char* destination, StreamPosition  count);
                    void        WriteData     (char* source,     StreamPosition  count);
        #endif
        // NO_Internal
10      };
        // NewPage
        /*
        ************************************************************************
        *       CLASS
15      *               TMappedFile
        *
        *       DESCRIPTION
        *               This class provides a mechanism for memory-mapped files. A TMappedFile
        object cannot
20      *               be deep-frozen into a stream.
        *
        ************************************************************************/
        class TMappedFile : public MOpenFile {
        public:
25                     enum EModificationVisibility
                       {
                               kPrivateModifications,
                               kPublicModifications
                       };
30                     enum EAddressPlacement
                       {
                               kMapAtSameAddress,
                               kMapAnywhere
                       };
35      //_____
        ___ // Special Functions
        //_____
            ___ TMappedFile     (const TFile& file,
```

```
    MOpenFile::EPermissionsForMe forMe      = MOpenFile::kReadWrite,
    MOpenFile::EPermissionsForOthers forOthers  = MOpenFile::kAllowNone,
    const TFileRange& rangeToMap            = TFileRange::kEntireFile, EModificationVisibility
    modVisibility = kPublicModifications, EAddressPlacement mappingConstraints =
5   kMapAnywhere
                                            ); virtual ~TMappedFile        ();
    //_____
    __ // Memory Management
    //_____
10  __     virtual void        Flush           ();
                    FileSystemEntitySize    GetEndOfFile    () const;
                    void                    SetEndOfFile    (FileSystemEntitySize
    endOfFile);
    //_____
15  __ // The next method lets you find out where this file was mapped.
    //_____
    __     virtual voi  GetMemorySurrogate    (TMemorySurrogate& mapRange) const;
    //_____
    __
20  // Move the window on the file that is mapped. A new TMemorySurrogate is filled in and
    // returned.
    // Any memory surrogates previously returned by this object should be considered invalid.
    //_____
    __     virtual void    SetRange        (const TFileRange& newRange,
25                                          TMemorySurrogate&
    newMapRange);  virtual void    GetRange    (   TFileRange&
    theRange) const;
    //_____
    __ // Streaming Support
30  //_____
    __
```

While the invention has been described in terms of a preferred embodiment in a specific system environment, those skilled in the art will recognize that the invention can be practiced, with modification, in other and different hardware and software environments within the spirit and scope of the appended claims.

While the invention has been described in terms of a preferred embodiment in a specific system environment, those skilled in the art will recognize that the invention can be practiced, with modification, in other and different hardware and software environments within the spirit and scope of the appended claims.

Having thus described our invention, what we claim as new, and desire to secure by letters patent is:

1. A client-extensible object oriented file system in an object oriented operating system, comprising:
   (a) at least one file device for storing and retrieving information;
   (b) a processor attached to the file device and having a memory, comprising:
   (c) a file system entity base class;
   (d) a client-subclassable file class, derived from the file system entity base class and having file member functions and attributes for defining and managing file objects created from the file class, including having means for storing and retrieving information from the file device;
   (e) a client-subclassable directory class, derived from the file system entity base class and having directory member functions and attributes for defining and managing directory objects created from the directory class, including a member function for creating a file object from the file class and for associating the created file object with a directory object created from the directory class;
   (f) a client-subclassable volume class, derived from the directory class, having volume member functions for controlling the file device;
   (g) wherein the file class, the directory class, and the volume class are subclassable in response to a client subclassing request to derive subclasses to supplement functionality of the file system, and wherein member functions of the file class, directory class, and volume class are invocable in response to client invocation requests and attributes of file objects, directory objects, and volume objects are accessible in response to client access requests.

2. The object oriented file system as recited in claim 2, wherein the file system entity base class comprises:
   (a) a member function for retrieving a property attribute representing the file object's file system entity kind; and
   (b) a member function for storing and retrieving a file access control list for a corresponding file system entity object, the file access control list comprising:
      a set of access permissions; and
      a plurality of principle/permissions pairs, the permissions specifying the access permissions of the file objects for the corresponding principle; and
      the file system entity class further having a member function for adding a principle/permissions pair to the file access control list, a member function for removing a principle/permissions pair from the file access control list; and a member function for retrieving the permissions associated with a principle.

3. The object oriented file system as recited in claim 1, further comprising:
   (a) a directory iterator class having member functions, responsive to client directory iteration requests, for iterating through a plurality of file system entity objects, including file objects and other directory objects, which are associated with a directory object, created from the directory class; and
   (b) a volume iterator class having member functions, responsive to client volume iteration requests, for iterating through a plurality of volume objects.

4. The object oriented file system as recited in claim 1, wherein the directory object comprises:
   (a) a method for retrieving a property object representing the directory object's file system entity kind; and
   (b) a method for creating the directory objects; and
   (c) a method for creating the file objects;
   (d) a directory access control list object comprising:
      a set of access permissions; and
      a plurality of principle/permissions pairs, the permissions specifying the access permissions to the directory objects for the corresponding principle; and
      a method for adding a principle/permissions pair to the directory access control list, and a method for removing a principle/permissions pair from the directory access control list; and
      a method for retrieving the permissions associated with a principle.

5. The object oriented file system as recited in claim 1, wherein the volume class comprises:
   (a) a member function for mounting the volume object; and
   (b) member functions for bringing a volume object online and taking the volume object offline; and
   (c) a member function for returning the total space and the free space in the volume object.

6. The object oriented file system as recited in claim 1, wherein the means for storing and retrieving information from the file device includes a file stream class comprising:
   (a) a member function for opening a file object with a set of access permissions; and
   (b) a member function for streaming file data into and out of the file object.

7. The object oriented file system as recited in claim 1, wherein the file system further comprises:
   a credentials class having means for creating a credentials object, in response to a client request, the credentials object including a principle attribute, which is representative of the client, and
   wherein the file system entity class includes a member function for comparing the principle attribute of a received credentials object with an access control list of a file system entity object to determine whether the client associated with the credentials object has permission to use the file system entity object.

8. The object oriented file system as recited in claim 1, wherein the file system further comprises
   a notifier class having a member function, responsive to a client registration request, for registering an interest of a client with a notifier object, created from the notifier class and associated with a file system entity object, the notifier class having means for determining whether the associated file system entity object is changed to satisfy the registered interest of the client and having means, responsive to such a determination, for notifying the registered client upon determining that the files system entity object changed in accordance with the registered interest.

9. The file system of claim 1, further comprising
   a property class having a member function for storing at least one property;

an iterator class having a member function, responsive to a client request that includes a property object created from the property class, for iterating over file system entity objects having the at least one property stored in the property object of the client request.

10. The file system of claim 9 wherein the client request which includes a property object is issued from a batch execution and wherein the file system entity objects that are iterated over by the member function for iterating are heterogeneous.

11. The file system of claim 9 wherein property objects created from the property class may be logically operated upon by a client, and wherein the file system further includes a primitive property class, derived from the property class, and an extended property class, derived from the property class, wherein primitive property objects correspond to file system supported objects and are created from the primitive property class and include member functions for manipulating property attribute values of the primitive property object, and wherein extended property objects correspond to client created objects and are created from the extended property class and include member functions for manipulating property attribute values of the extended property object.

12. The file system of claim 9 further comprising a subclassable property ID class having member functions for storing and retrieving an ID associated with a property wherein a client may invoke the member functions for storing and retrieving to logically compare the ID of a property ID object, created from the property ID class, with a second ID of a file system entity object.

13. The file system of claim 12 further including a property query class having member functions for storing a client query request which include at least one ID, the property query class further including member functions for comparing the stored query request with a property ID of a file system entity object such that a client can invoke an iterator object, created from the iterator class, to iterate over file system entity objects to determine whether a file system entity object has properties that satisfy the query request.

* * * * *